US012755655B2

(12) United States Patent
Kim

(10) Patent No.: US 12,755,655 B2
(45) Date of Patent: Oct. 6, 2026

(54) DISPLAY APPARATUS

(71) Applicant: LG Display Co., Ltd., Seoul (KR)

(72) Inventor: DaeHyun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 65 days.

(21) Appl. No.: 18/756,683

(22) Filed: Jun. 27, 2024

(65) Prior Publication Data

US 2025/0246100 A1 Jul. 31, 2025

(30) Foreign Application Priority Data

Jan. 26, 2024 (KR) ........................ 10-2024-0012368

(51) Int. Cl.
*G09F 9/30* (2006.01)

(52) U.S. Cl.
CPC .................................... *G09F 9/301* (2013.01)

(58) Field of Classification Search
CPC ...... G09F 9/301; H10K 59/87; H10K 59/131; H10K 77/111
See application file for complete search history.

(56) References Cited

U.S. PATENT DOCUMENTS

| | | | | |
|---|---|---|---|---|
| 10,720,589 B2 * | 7/2020 | Chen | B32B 7/12 |
| 10,854,828 B2 * | 12/2020 | Furuie | H10K 59/87 |
| 2016/0320803 A1 * | 11/2016 | Oh | B32B 3/085 |
| 2022/0181576 A1 * | 6/2022 | Cha | H10K 77/111 |
| 2026/0081984 A1 * | 3/2026 | Lee | H04M 1/0268 |

FOREIGN PATENT DOCUMENTS

| | | |
|---|---|---|
| KR | 10-2341525 B1 | 12/2021 |
| KR | 10-2023-0082223 A | 6/2023 |

* cited by examiner

*Primary Examiner* — Imani N Hayman
*Assistant Examiner* — Hung Q Dang
(74) *Attorney, Agent, or Firm* — Seed Intellectual Property Law Group LLP

(57) ABSTRACT

A display apparatus includes a substrate comprising a display area, and a non-display area comprising a bending portion. The display apparatus further includes a support member disposed below the substrate in the display area. The display apparatus further includes a micro-coating layer disposed on the substrate in the bending portion. The display apparatus further includes a reinforcement member disposed below the substrate in the bending portion. The reinforcement member comprises a rigid part.

22 Claims, 17 Drawing Sheets

DISPLAY APPARATUS

CROSS-REFERENCE TO RELATED APPLICATIONS

This application claims the priority of Korean Patent Application No. 10-2024-0012368 filed on Jan. 26, 2024, in the Korean Intellectual Property Office, the disclosure of which is incorporated herein by reference.

BACKGROUND

Technical Field

The present specification relates to a display apparatus.

Description of the Related Art

With the advancement of technologies in the modern society, various display apparatus are being developed to provide information to users. There are various types of display apparatus, such as liquid crystal display apparatus, organic light-emitting display apparatus, and inorganic light-emitting display apparatus, for displaying images.

The range of application of the display apparatus is diversified, and studies are being conducted on the display apparatus having wide display areas and having reduced volumes and weights.

BRIEF SUMMARY

With the miniaturization of display apparatus, there is a continuous effort to reduce a bezel area, which is a non-display area, i.e., an outer peripheral portion of a display area, in order to increase a size of an effective display screen in a state in which an area of the display apparatus remains the same.

Regarding a flexible light-emitting display apparatus to which a flexible substrate made of a flexible material, such as plastic, is applied so that the display performance may be maintained even though the flexible light-emitting display apparatus is bent, there is an effort to reduce a bezel area by bending a non-display area of a substrate in order to reduce the bezel area while ensuring areas for lines and drive circuits. As the bezel area is reduced, a radius of curvature of a bending portion of a display panel, which is bent, decreases, and stress applied to lines on the bending portion increases, which may cause cracks. For this reason, a risk of an operational defect of the display panel may be increased at room temperature or in a high-temperature environment. Accordingly, the inventors of the present specification recognized the above-mentioned problems and invented a new display apparatus capable of suppressing the occurrence of cracks in the bending portion of the display apparatus and improving the performance of the display apparatus.

An object to be achieved by the embodiment of the present specification is to provide a display apparatus capable of improving the reliability of the display apparatus by minimizing a short circuit of a line by reinforcing rigidity of a substrate.

Objects of the present disclosure are not limited to the above-mentioned objects, and other objects, which are not mentioned above, can be clearly understood by those skilled in the art from the following descriptions.

A display apparatus according to an embodiment of the present specification may include a substrate including a display area, and a non-display area including a bending portion, a support member disposed below the substrate in the display area, and a reinforcement member disposed below the substrate in the bending portion, in which the reinforcement member includes a rigid part.

A display apparatus according to another embodiment of the present specification may include a substrate including a display area and a bending portion, a backplate disposed below the substrate in the display area, and a reinforcement member disposed below the substrate in the bending portion, in which the reinforcement member includes at least two support layers.

Other detailed matters of the exemplary embodiments are included in the detailed description and the drawings.

According to the embodiment of the present specification, the reinforcement may be applied to the display apparatus to reinforce the rigidity of the display apparatus, which may improve the performance and/or reliability of the display apparatus. Therefore, according to the embodiment, the lifespan of the display apparatus may be improved, and the power consumption may be reduced, such that the environmentally-friendly low-power display apparatus may be provided.

According to the embodiment of the present specification, the rigid part applied to the display apparatus reinforces the rigidity of the bending portion, such that the display apparatus capable of minimizing damage to the bending portion may be provided.

According to the embodiment of the present specification, the support layer is disposed in the bending area of the display apparatus, and the rigid part, which has a larger modulus than the support layer, is disposed in the bending area of the display apparatus, such that the display apparatus may ensure both the flexibility and the rigidity, suppress a short circuit of the signal line, and minimize an operational defect.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
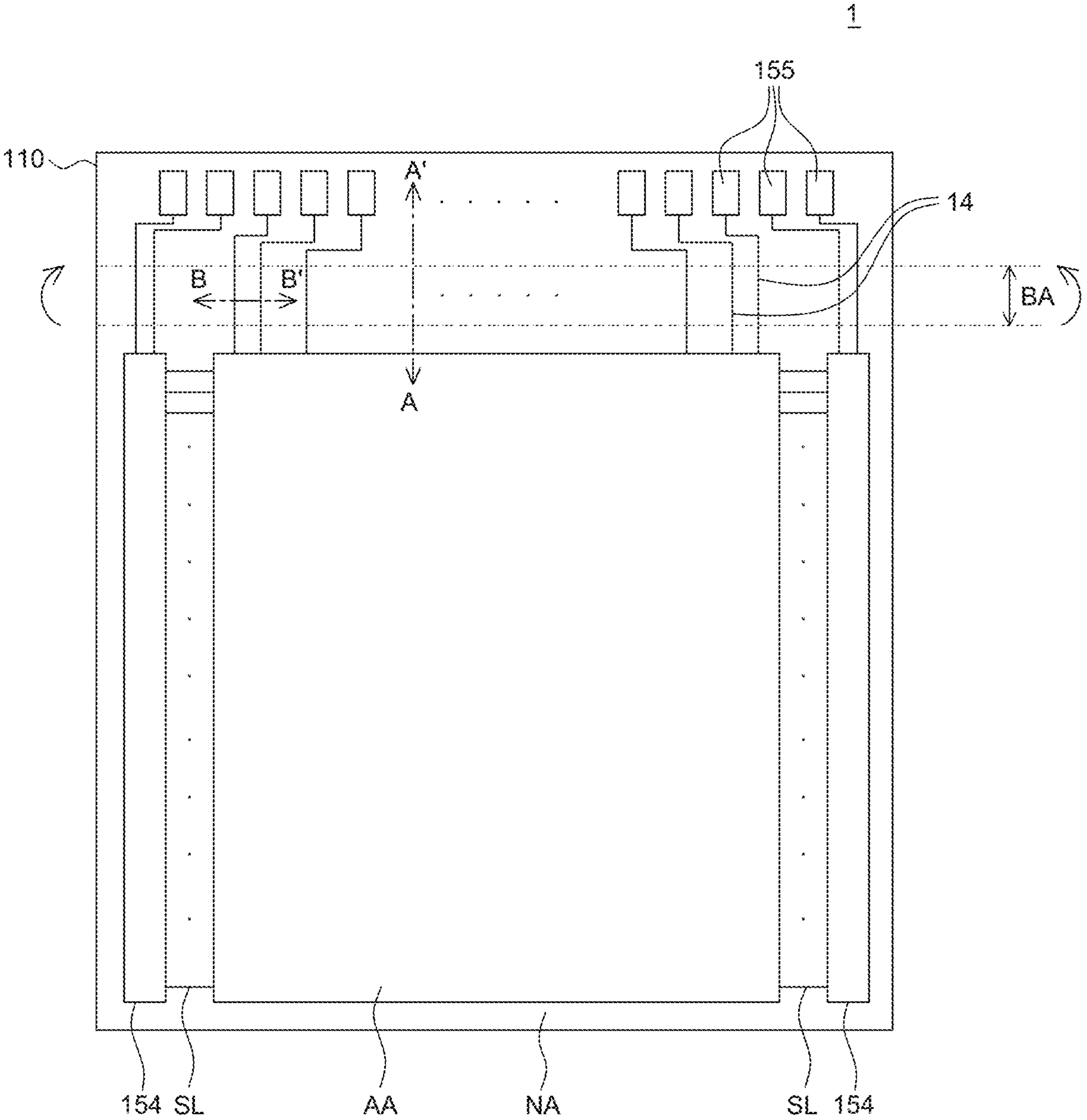
FIG. 1 is a top plan view of a display apparatus according to an embodiment of the present specification.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When the relation of a time sequential order is described using the terms such as "after", "continuously to", "next to", and "before", the order may not be continuous unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

In describing components of the exemplary embodiment of the present disclosure, terminologies such as first, second, A, B, (a), (b), and the like may be used. These terminologies are used to distinguish a component from the other component, but a nature, an order, or the number of the components is not limited by the terminology. When a component is "linked", "coupled", or "connected" to another component, the component may be directly linked or connected to the other component. However, unless specifically stated otherwise, it should be understood that a third component may be interposed between the components which may be indirectly linked or connected.

It should be understood that "at least one" includes all combinations of one or more of associated components. For example, "at least one of first, second, and third components" means that not only a first, second, or third component, but also all combinations of two or more of first, second, and third components are included.

In the present specification, a "display apparatus" may include a display apparatus which includes a display panel and a driver for driving the display panel, in a narrow sense, such as a liquid crystal module (LCM), an organic light emitting module (OLED module), and a quantum dot module. Further, the "display apparatus" may further include a set electronic apparatus or a set apparatus (or a set device) which is a complete product or a final product including an LCM, an OLED module, a QD module, etc., such as a notebook computer, a television, or a computer monitor, an automotive display apparatus or equipment display apparatus including another type of vehicle and a mobile electronic apparatus including a smart phone or an electronic pad.

Accordingly, the display apparatus of the present disclosure may include not only a display apparatus itself in a narrow sense such as an LCM, an OLED module, a QD module, etc., but also an applied product or a set apparatus which is a final consumer device including the LCD, the OLED module, the QD module, etc.

Further, in some cases, the LCM, the OLED module, or the QD module which is configured by a display panel and a driver may be represented as "a display apparatus" in a narrow sense and an electronic device as a complete product including the LCM, the OLED module, and the QD module may be represented as a "set apparatus". For example, the display apparatus in the narrow sense includes a liquid crystal (LCD) display panel, an OLED display panel, or a quantum dot display panel and a source PCB which is a controller for driving the display panel. In contrast, the set apparatus may be a concept further including a set PCB which is a set controller which is electrically connected to the source PCB to control the entire set apparatus.

As a display panel used in the exemplary embodiment of the present disclosure, any type of display panel such as a liquid crystal display panel, an organic light emitting diode (OLED) display panel, a quantum dot (QD) display panel, and an electroluminescent display panel may be used. The display panel of the present exemplary embodiment is not limited to a specific display panel in which a bezel is bent with a flexible substrate for the organic light emitting diode (OLED) display panel and a back plate support structure therebelow. Further, a display panel used for the display apparatus according to the exemplary embodiment of the present disclosure is not limited to a shape or a size of the display panel.

For example, when the display panel is an OLED display panel, the display panel may include a plurality of gate lines, data lines, and pixels formed at intersecting areas of the gate lines and/or data lines. Further, the display panel may be configured to include an array including a thin film transistor which is an element to selectively apply a voltage to each pixel, a light emitting diode layer on the array, an encapsulation substrate or an encapsulation layer, and the like disposed on the array so as to cover the light emitting diode layer. The encapsulation layer may protect the thin film transistor the light emitting diode layer, and the like from external impacts and may suppress the permeation of moisture or oxygen into the light emitting diode layer. Further, a layer formed on the array may include an inorganic light emitting layer, for example, a nano-sized material layer quantum dots, or the like.

The features of various exemplary embodiments of the present disclosure can be partially or entirely coupled to or combined with each other and can be interlocked and operated in technically various ways, and the exemplary embodiments can be carried out independently of or in association with each other.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

FIG. 1 is a top plan view of a display apparatus according to an embodiment of the present specification.

With reference to FIG. 1, a display apparatus 1 may include a display area AA, and a non-display area NA that is a bezel area configured to surround an edge of the display area AA. In the display area AA, a pixel is disposed on a substrate 110 and actually emits light through a thin-film transistor and a light-emitting element.

The substrate 110 may be made of a plastic material having flexibility and have flexible properties. The substrate 110 may include polyimide and be made of a glass material having flexibility and a small thickness. The embodiments of the present specification are not limited thereto.

Circuits, such as a gate drive part 154, for operating the display apparatus 1 and various signal lines, such as a scan line SL, may be disposed in the non-display area NA of the substrate 110.

The circuit for operating the display apparatus 1 may be disposed on the substrate 110 in a gate-in-panel (GIP) manner or connected to the substrate 110 in a tape-carrier-package (TCP) or chip-on-film (COF) manner.

At least one pad 155, which is a metal pattern, may be disposed at one side of the substrate 110 in the non-display area NA, and an external module may be bonded.

A bending portion BA may be formed by bending a part of the non-display area NA of the substrate 110 in a bending direction indicated by the arrows.

The non-display area NA of the substrate 110 is an area in which lines and a drive circuit for operating a screen are disposed. Because the non-display area NA is not an area in which images are displayed, the non-display area NA need not be visually recognized from a top surface of the substrate 110. Therefore, it is possible to reduce a bezel area while ensuring an area for the line and the drive circuit by bending a partial area of the non-display area NA of the substrate 110.

Various lines may be formed on the substrate 110. The lines may also be formed in the display area AA of the substrate 110. Signal lines 14 formed in the non-display area NA may connect the drive circuit, a gate driver, and a data driver and transmit signals.

The signal lines 14 may each be made of an electrically conductive material. The signal lines 14 may each be made of an electrically conductive material having excellent flexibility in order to reduce the occurrence of cracks when the substrate 110 is bent. The signal lines 14 may each be made of an electrically conductive material such as gold (Au), silver (Ag), or aluminum (Al) that has excellent flexibility. The signal lines 14 may each be made of one of various electrically conductive materials used for the display area AA. The lines 14 may each be made of an alloy of molybdenum (Mo), chromium (Cr), titanium (Ti), nickel (Ni), neodymium (Nd), copper (Cu), silver (Ag), and magnesium (Mg).

The signal line 14 may have a multilayer structure including various electrically conductive materials. For example, the signal line 14 may have a three-layer structure including titanium (Ti)/aluminum (Al)/titanium (Ti). However, the present specification is not limited thereto.

The signal line 14 formed on the bending portion BA may receive a tensile force when the bending portion BA is bent. The signal line 14, which extends in a direction identical to the bending direction on the substrate 110, may receive the highest tensile force, which may cause cracks or line disconnection. For example, the signal line 14 is not formed to extend in the bending direction. At least some of the signal lines 14 disposed while including the bending portion BA may be formed to extend in an oblique direction different from the bending direction, which may minimize a tensile force.

The signal lines 14 disposed while including the bending portion BA may each be formed in various shapes, e.g., a trapezoidal wave shape, a triangular wave shape, a serrated wave shape, a sine wave shape, an omega ((2) shape, a rhombic shape, or the like. The embodiments of the present specification are not limited thereto.

Figure 2:
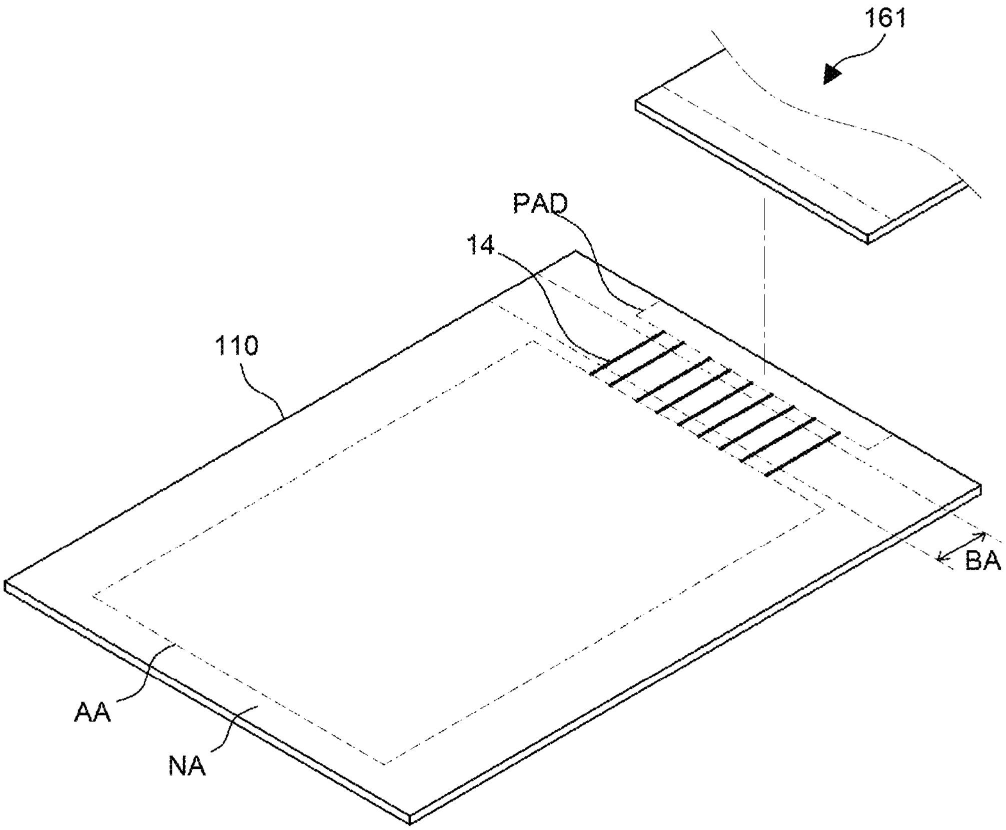
FIG. 2 is a perspective view of the display apparatus according to the embodiment of the present specification.

FIG. 2 is a perspective view of the display apparatus according to the embodiment of the present specification.

Figure 3:
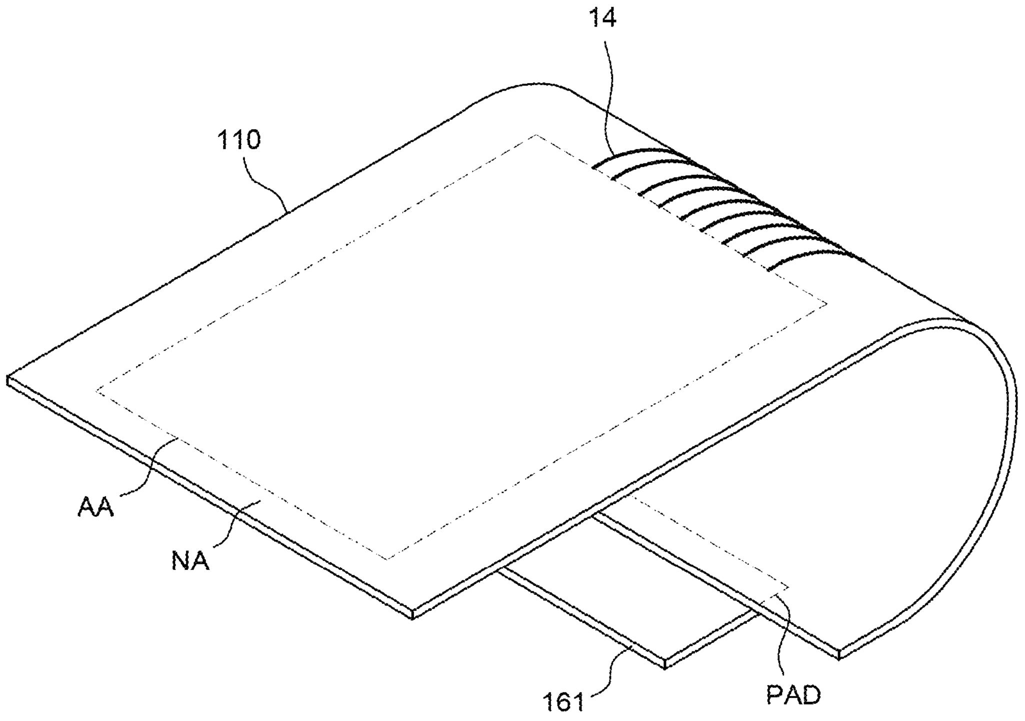
FIG. 3 is a perspective view illustrating a bent state of the display apparatus according to the embodiment of the present specification.

FIG. 3 is a perspective view illustrating a bent state of the display apparatus according to the embodiment of the present specification.

With reference to FIG. 2, the display apparatus 1 according to the embodiment of the present specification may include the substrate 110 and a circuit element 161.

The substrate 110 may be divided into the display area AA, and the non-display area NA that is a bezel area that surrounds the edge of the display area AA.

The non-display area NA may include a pad part PAD defined outside the display area AA. A plurality of subpixels may be disposed in the display area AA. The subpixels may be arranged in the display area AA in an R (red), G (green), B (blue) manner or an R, G, B, W (white) manner, thereby implementing a full color. The subpixels may be separated by a gate line and a data line that intersect each other.

The circuit element 161 may include bumps (or terminals). The bumps of the circuit element 161 may be respectively joined to pads of the pad part PAD by means of an anisotropic conductive film (ACF). For example, the circuit element 161 may be a chip-on film (COF) made by mounting a drive IC on a flexible film.

For example, the circuit element 161 may be configured as a COG type joined directly to the pads on the substrate by a chip-on glass (COG) process. For example, the circuit element 161 may be a flexible circuit such as a flexible flat cable (FFC) or a flexible printed circuit (FPC). The embodiments of the present specification are not limited thereto.

The driving signals, e.g., the gate signal and the data signal received through the circuit element 161 may be supplied to the gate lines and the data lines in the display area AA through the signal lines 14 such as a routing line.

In the display apparatus 1, in addition to the display area AA in which an input image is implemented, a sufficient space, in which the pad part PAD, the circuit element 161, and the like may be positioned, needs to be ensured. This space corresponds to a bezel area. The bezel area is recognized by a user positioned forward of a front surface of the display apparatus 1, which may cause deterioration in aesthetic appearance.

With reference to FIG. 3, in the display apparatus according to the embodiment of the present specification, a lower edge of the substrate 110 may be bent in a direction toward a rear surface so as to have a predetermined curvature.

The lower edge of the substrate 110 may correspond to an outer side of the display area AA and correspond to an area in which the pad part PAD is positioned. When the substrate 110 is bent, the pad part PAD may be positioned to overlap the display area AA in the direction of the rear surface of the display area AA. Therefore, it is possible to minimize the bezel area recognized from a location disposed forward of the display apparatus 1. Therefore, a bezel width may be reduced, and the aesthetic appearance may be improved.

For example, the substrate 110 may be made of a flexible material that may be bent. For example, the substrate 110 may be made of a plastic material such as polyimide (PI). For example, the signal line 14 may be made of a material having flexibility. For example, the signal line 14 may be made of a material such as a metal nano-wire, a metal mesh, or a carbon nanotube (CNT). The embodiments of the present specification are not limited thereto.

The signal lines 14 may extend from the display area AA and be disposed on the bending portion BA. For example, the signal line 14 disposed on the bending portion BA may extend along an outer peripheral surface of the substrate 110.

Figure 4:
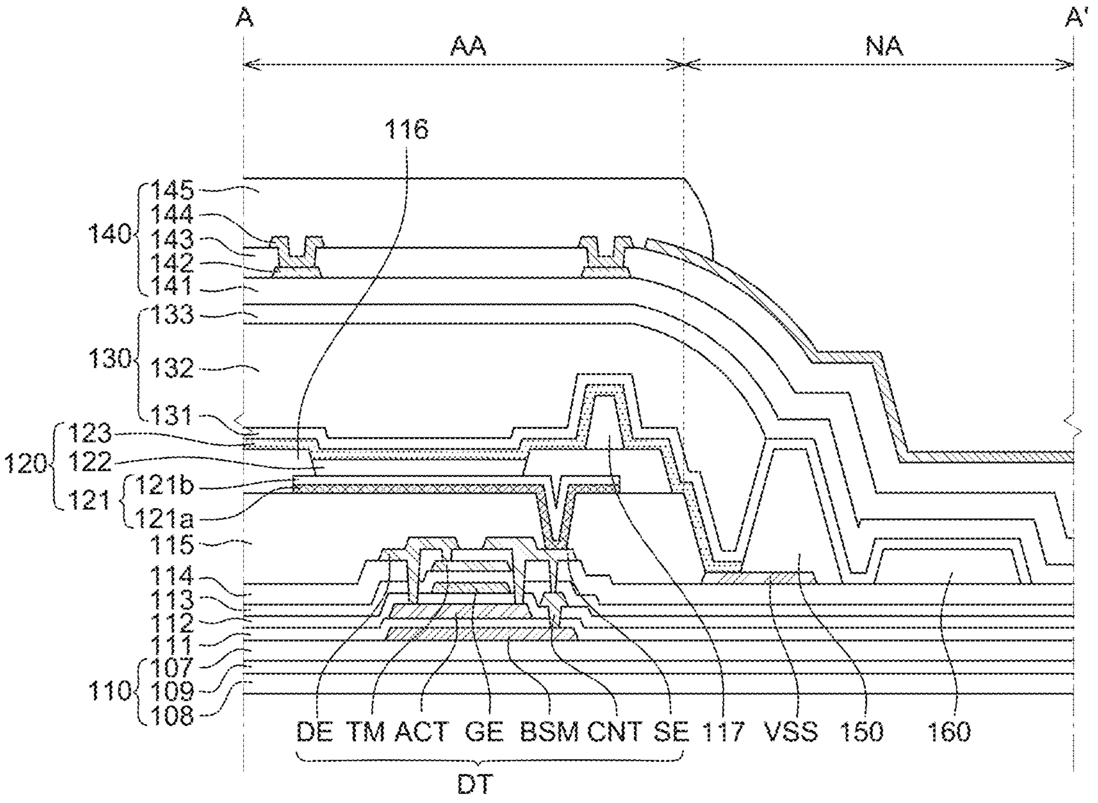
FIG. 4 is a cross-sectional view of the display panel according to the embodiment of the present specification taken along line A-A' in FIG. 1.

FIG. 4 is a cross-sectional view of the display panel according to the embodiment of the present specification taken along line A-A' in FIG. 1.

Hereinafter, an example will be described in which the display apparatus is an organic light-emitting display apparatus. However, the display apparatus may be another light-emitting display apparatus, such as an inorganic light-emitting display apparatus or a quantum-dot light-emitting display apparatus. The embodiments of the present specification are not limited thereto.

FIG. 4 is a cross-sectional view taken along line A-A' in FIG. 1.

With reference to FIG. 4, the substrate 110 may include a first substrate 107, an interlayer insulation film 109, and a second substrate 108.

The first substrate 107 and the second substrate 108 may be substrates, i.e., insulation substrates configured to support constituent elements disposed above the substrate 110. For example, the first substrate 107 and the second substrate 108 may be made of glass, resin, or the like. For example, the first substrate 107 and the second substrate 108 may include polymer or plastic. In several embodiments, the first substrate 107 and the second substrate 108 may be made of a plastic material having flexibility.

The interlayer insulation film 109 may be disposed between the first substrate 107 and the second substrate 108. The interlayer insulation film 109 may include an inorganic material and protect the first substrate 107 and the second substrate 108 from the penetration of moisture. The embodiments of the present specification are not limited thereto.

A plurality of pixels may be formed on the substrate 110 so that images may be displayed. The substrate 110 may include the display area AA and the non-display area NA configured to surround the display area AA.

The display area AA is an area of a display panel 100 of the display apparatus in which images are displayed. The display area AA may include the plurality of subpixels constituting the plurality of pixels, and the plurality of signal lines configured to operate the plurality of subpixels. The plurality of subpixels is minimum units that constitute the display area AA. The n subpixels may constitute a single pixel. A light-emitting element, a thin-film transistor for operating the light-emitting element, and the like may be disposed in each of the plurality of subpixels. The plurality of light emitting elements may be differently defined depending on the type of display panel. For example, the light-emitting element may be an organic light-emitting diode (OLED). For example, the light-emitting element may be an inorganic light-emitting element (micro-LED). The embodiments of the present specification are not limited thereto.

A suppression structure 150 may be disposed in the non-display area NA and surround a part or the entirety of the display area AA. For example, the suppression structure 150 may be a dam DAM. The suppression structure 150 may be disposed adjacent to the display area AA and disposed outward of the display area AA.

A crack suppression layer 160 (panel crack detector) may be further disposed in a part of the non-display area NA of the substrate 110. In the embodiment, at least a partial area of the crack suppression layer 160 may be spaced apart from the suppression structure 150. However, the embodiments of the present specification are not limited thereto.

With reference to FIG. 4, a light-blocking layer BSM may be disposed on the substrate 110. The light-blocking layer BSM may block light entering active layers ACT of a plurality of transistors, thereby minimizing a leakage current. For example, the light-blocking layer BSM may be disposed below an active layer ACT of a transistor DT and block light entering the active layer ACT. For example, in case that the light is emitted to the active layer ACT, a leakage current occurs, which may degrade the reliability of the transistor DT. Therefore, the light-blocking layer BSM for blocking light may be disposed on the substrate 110, thereby improving the reliability of the transistor DT. The light-blocking layer BSM may be made of an opaque electrically conductive material, for example, copper (Cu), aluminum (Al), molybdenum (Mo), nickel (Ni), titanium (Ti), chromium (Cr), or an alloy thereof. However, the present specification is not limited thereto.

A buffer layer 111 may be disposed on the light-blocking layer BSM. The buffer layer 111 may reduce the penetration of moisture or impurities through the substrate 110. For example, the buffer layer 111 may be configured as a single layer or multilayer made of silicon oxide (SiOx) or silicon nitride (SiNx). However, the present specification is not limited thereto. However, the buffer layer 111 may be excluded in accordance with the type of the substrate 110 or the type of transistor DT. However, the present specification is not limited thereto.

The transistor DT including the active layer ACT, a gate electrode GE, a source electrode SE, and a drain electrode DE may be disposed on the buffer layer 111.

For example, an additional buffer layer may be disposed between the substrate 110 and the light-blocking layer BSM. For example, like the buffer layer 111, the additional buffer layer may be configured as a single layer or multilayer made of silicon oxide (SiOx) or silicon nitride (SiNx) in order to reduce the penetration of moisture or impurities through the substrate 110. However, the present disclosure is not limited thereto.

First, the active layer ACT of the transistor DT may be disposed on the buffer layer 111. The active layer ACT may be made of a semiconductor material such as an oxide semiconductor, amorphous silicon, or polysilicon. However, the present specification is not limited thereto.

For example, in addition to the transistor DT, other transistors, such as a switching transistor, a sensing transistor, and a light emission control transistor, may be additionally disposed. The active layers of these transistors may be made of a semiconductor material such as an oxide semiconductor, amorphous silicon, or polysilicon. However, the present specification is not limited thereto.

For example, the active layers of the transistors, such as the transistor DT, the switching transistor, the sensing transistor, and the light emission control transistor, which are included in pixel circuits, may be made of the same material or different materials.

A first insulation layer 112 may be disposed on the active layer ACT. For example, the first insulation layer 112 may be a gate insulation layer, i.e., an insulation layer for electrically insulating the active layer ACT and the gate electrode GE. The first insulation layer 112 may be configured as a single layer or multilayer made of silicon oxide (SiOx) or silicon nitride (SiNx). However, the present specification is not limited thereto.

The gate electrode GE may be disposed on the first insulation layer 112. The gate electrode GE may be made of an electrically conductive material, for example, copper (Cu), aluminum (Al), molybdenum (Mo), nickel (Ni), titanium (Ti), chromium (Cr), or an alloy thereof. However, the present specification is not limited thereto.

For example, a connection electrode CNT may be disposed on the first insulation layer 112. The connection electrode CNT may be made of the same material as the gate electrode GE and electrically connected to the source electrode SE and the light-blocking layer BSM.

A first interlayer insulation layer 113 and a second interlayer insulation layer 114 may be disposed on the gate electrode GE. Contact holes, through which the source electrode SE and the drain electrode DE are connected to the active layer ACT, are formed in the first interlayer insulation layer 113 and the second interlayer insulation layer 114. The first interlayer insulation layer 113 and the second interlayer insulation layer 114 are insulation layers for protecting components disposed below the first interlayer insulation layer 113 and the second interlayer insulation layer 114. The first interlayer insulation layer 113 and the second interlayer insulation layer 114 may each be configured as a single layer or multilayer made of silicon oxide (SiOx) or silicon nitride (SiNx). However, the present specification is not limited thereto.

A storage capacitor Cst may be disposed on the first insulation layer 112. The storage capacitor Cst may be implemented by using an intermediate electrode TM and the gate electrode GE as capacitor electrodes. However, the present specification is not limited thereto. The storage capacitor Cst may be implemented may be implemented in various ways.

The intermediate electrode TM may be disposed on the first interlayer insulation layer 113. The intermediate electrode TM may be disposed to overlap the gate electrode GE with the first interlayer insulation layer 113 interposed therebetween.

The source electrode SE and the drain electrode DE are disposed on the second interlayer insulation layer 114 and electrically connected to the active layer ACT. The drain electrode DE may be electrically connected to the intermediate electrode TM of the storage capacitor Cst, and the source electrode SE may be connected to a first electrode 121 of a light-emitting element 120. The source electrode SE and the drain electrode DE may each be made of an electrically conductive material, for example, copper (Cu), aluminum (Al), molybdenum (Mo), nickel (Ni), titanium (Ti), chromium (Cr), or an alloy thereof. However, the present specification is not limited thereto.

A planarization layer 115 may be disposed on the source electrode SE and the drain electrode DE. The planarization layer 115 may planarize an upper portion of the pixel circuit including the transistor DT. The planarization layer 115 may be configured as a single layer or multilayer and made of benzocyclobutene or an acrylic-based organic material, for example. However, the present specification is not limited thereto.

The plurality of light-emitting elements 120 is provided on the planarization layer 115 and respectively disposed in a plurality of subpixels SP. The light-emitting elements 120 may be elements configured to emit light by the current and include a red light-emitting element configured to emit red light, a green light-emitting element configured to emit green light, and a blue light-emitting element configured to emit blue light. A combination of the light-emitting elements 120 may implement various colors including white. For example, the light-emitting element 120 may be an organic light-emitting diode. However, the present specification is not limited thereto.

The light-emitting element 120 may include the first electrode 121, a light-emitting layer 122, and a second electrode 123.

The first electrode 121 may be disposed on the planarization layer 115. The first electrode 121 may include a reflective layer **121*a* and a transparent conductive layer 121*b*. For example, the transparent conductive layer 121*b* may be disposed on the reflective layer 121*a*. The reflective layer 121*a* and the transparent conductive layer 121*b* are layers for supplying positive holes to the light-emitting layer 122. The reflective layer 121*a* and the transparent conductive layer 121*b* may each be made of an electrically conductive material having a high work function. For example, the reflective layer 121*a* may have a layered structure made of an alloy of silver (Ag), palladium (Pd), and copper (Cu) that are metallic materials with high reflectance. However, the present specification is not limited thereto. For example, the transparent conductive layer 121*b*** may be made of indium-tin-oxide (ITO) that is transparent conductive oxide (TCO). However, the present specification is not limited thereto.

A bank 116 may be disposed on the first electrode 121 and the planarization layer 115. The bank 116 may cover an edge of the first electrode 121 of the light-emitting element 120 and define a light-emitting area. For example, the bank 116 may separate the plurality of subpixels SP. The bank 116 may be made of an insulating material to insulate the first electrodes 121 of the adjacent subpixels SP. For example, the bank 116 may be configured as a black bank including a black material with a high optical absorption rate to suppress a color mixture between the adjacent subpixels SP. For example, the bank 116 may be configured as a black bank to which a black pigment is added to reduce light reflection. The embodiments of the present specification are not limited thereto.

For example, the bank 116 may be made of at least one of the materials including inorganic insulating materials, such as silicon nitride (SiNx) or silicon oxide (SiOx), or organic insulating materials such as benzocyclobutene (BCB), acrylic resin, epoxy resin, phenolic resin, polyamide resin, or polyimide resin. The embodiments of the present specification are not limited thereto.

A spacer 117 may be disposed on the bank 116. The spacer 117 refers to a layer that maintains a predetermined distance between a deposition mask and the bank 116 to suppress damage caused by contact with the deposition mask. Like the bank 116, the spacer 117 may be made of polyimide resin, acrylic resin, or benzocyclobutene (BCB) resin. However, the present specification is not limited thereto. The bank 116 and the spacer 117 are separately illustrated in FIG. 4. However, in the embodiment, the spacer 117 may be made of the same material as the bank 116. The bank 116 and the spacer 117 may be formed integrally and simultaneously by a single process. The embodiments of the present specification are not limited thereto.

For example, the spacer 117 may compensate for an empty space between an upper substrate and the substrate 110 having the light-emitting element 120, thereby minimizing damage to the display apparatus caused by an impact from the outside.

The light-emitting layer 122 may be disposed on the first electrode 121. The light-emitting layer 122 is a layer that emits light by combining electrons and positive holes.

The second electrode 123 may be disposed on the light-emitting layer 122. The second electrode 123 may be made of a metallic material with a low work function in order to smoothly supply electrons to the light-emitting layer 122. For example, the second electrode 123 may be made of a metallic material selected from calcium (Ca), barium (Ba), aluminum (Al), silver (Ag), and an alloy containing one or more of the above-mentioned elements. However, the present specification is not limited thereto.

The light-emitting element 120 may further include a hole injection layer, a hole transport layer, an electron transport layer, an electron injection layer, and the like to improve luminous efficiency of the light-emitting element 120. For example, the hole injection layer and the hole transport layer may be disposed between the first electrode 121 and the light-emitting layer 122, and the electron transport layer and the electron injection layer may be disposed between the light-emitting layer 122 and the second electrode 123. In addition, a hole blocking layer or an electron blocking layer may be disposed on the light-emitting layer 122 to further improve the efficiency in recombining positive holes and electrons.

An encapsulation part 130 may be disposed on the light-emitting element 120. The encapsulation part 130 may protect the light-emitting element 120 from external moisture, oxygen, impact, and the like. The encapsulation part 130 may have a multilayer structure in which an inorganic layer, which is made of an inorganic insulating material, and an organic layer, which is made of an organic material, are stacked. For example, the encapsulation part 130 may have a multilayer structure including at least one organic layer and at least two inorganic layers and made by alternately stacking the inorganic layers and the organic layer. However, the present specification is not limited thereto. For example, the encapsulation part 130 may have a three-layer structure including a first inorganic encapsulation layer 131, an organic encapsulation layer 132, and a second inorganic encapsulation layer 133. In this case, the first inorganic encapsulation layer 131 and the second inorganic encapsulation layer 133 may each be independently made of one or more materials selected from a group consisting of silicon nitride (SiNx), silicon oxide (SiOx), aluminum oxide (AlOx), and silicon oxynitride (SiON). However, the present specification is not limited thereto. For example, the organic encapsulation layer 132 may be made of one or more materials selected from a group consisting of epoxy resin, polyimide resin, polyethylene resin, and silicon oxycarbide (SiOC). However, the present specification is not limited thereto.

A touch detection part 140 may be disposed on the encapsulation part 130 to recognize a user's touch. The touch detection part 140 may include a touch buffer layer 141, a touch bridge electrode 142, a touch insulation layer 143, a touch electrode 144, and a touch protective layer 145.

The touch buffer layer 141 may be disposed on the encapsulation part 130. The touch buffer layer 141 may be a layer for suppressing damage to the light-emitting element 120 and the encapsulation part 130 and made of an inorganic material excellent in barrier properties. Therefore, it is possible to minimize the penetration of moisture or oxygen. For example, the touch buffer layer 141 may be configured as a single layer or multilayer made of silicon nitride (SiNx) or silicon oxide (SiOx). However, the present specification is not limited thereto.

The touch bridge electrode 142 may be disposed on the touch buffer layer 141. The touch bridge electrode 142 may connect the touch electrode 144.

The touch insulation layer 143 may be disposed on the touch buffer layer 141 and the touch bridge electrode 142. The touch insulation layer 143 may be a layer for insulating the touch bridge electrode 142 and the touch electrode 144 and made of an inorganic material. For example, the touch insulation layer 143 may be configured as a single layer or multilayer made of silicon oxide (SiOx) or silicon nitride (SiNx). However, the present specification is not limited thereto.

The touch electrode 144 may be disposed on the touch insulation layer 143. The touch electrode 144 is an electrode configured to detect a touch input. The touch electrode 144 may include a sensing electrode and a driving electrode and detect touch coordinates by sensing a change in capacitance between the sensing electrode and the driving electrode. For example, the touch electrode 144 may be made of a transparent metallic material, such as indium-tin-oxide (ITO) or indium-zinc-oxide (IZO), that may transmit light. However, the present specification is not limited thereto.

For example, the touch electrode 144 may be disposed on the touch insulation layer 143. A touch line may electrically connect the touch electrode 144 and a touch circuit. The touch line may be disposed on the same layer as the touch electrode 144. However, the present specification is not limited thereto.

The touch protective layer 145 may be disposed on the touch electrode 144. The touch protective layer 145 is a layer that suppresses a short circuit of or damage to the touch electrode 144 and planarizes a top surface of the touch electrode 144. For example, the touch protective layer 145 may be made of a transparent insulation resin such as acrylic resin, polyester resin, or epoxy resin. However, the present specification is not limited thereto.

For example, a power line VSS may be disposed in the non-display area NA and connected to the second electrode 123. The power line VSS may be electrically connected to the second electrode 123 of the light-emitting element 120 and apply a power voltage to the light-emitting element 120.

The suppression structure 150 may be disposed on the power line VSS. The suppression structure 150 is disposed to control an overflow of the organic encapsulation layer 132 of the encapsulation part 130. The suppression structure 150 may include a lower layer made of the same material as the planarization layer 115, and an upper layer made of the same material as the bank 116. However, the present specification is not limited thereto. The suppression structure 150 may include three or more layers. In addition, FIG. 4 illustrates only the single suppression structure 150. However, a plurality of suppression structures 150, i.e., two or more suppression structures 150 may be provided. However, the present specification is not limited thereto. The encapsulation part 130, the touch buffer layer 141, and the touch insulation layer 143 may be disposed above the suppression structure 150.

The crack suppression layer 160 may be disposed outside the suppression structure 150. The crack suppression layer 160 may mitigate an external impact and inhibit cracks from propagating to the display area AA. Therefore, the crack suppression layer 160 may be made of an organic insulating material with a high strain rate and impact resistance. For example, the crack suppression layer 160 may be made of the same material as the planarization layer 115 or the bank 116. However, the present specification is not limited thereto.

Figure 5:
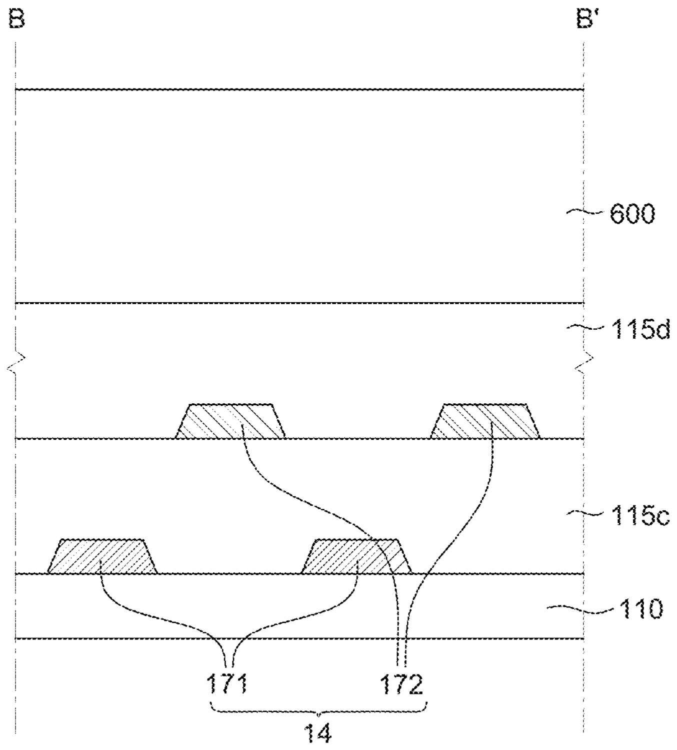
FIG. 5 is a cross-sectional view taken along line B-B' in FIG. 1.

FIG. 5 is a cross-sectional view taken along line B-B' in FIG. 1.

Because some constituent elements in FIG. 5 are substantially identical or similar to the constituent elements described with reference to FIG. 4, a description thereof will be omitted.

The gate signal and the data signal, which have been described with reference to FIG. 1, are transmitted from the outside to the pixels, which are disposed in the display area AA, through circuit lines disposed in the non-display area NA of the display apparatus 1, such that light is emitted.

In case that the line disposed in the non-display area NA including the bending portion BA of the display apparatus 1 has a single-layer structure, a large space is required to dispose the line. After an electrically conductive material is deposited, a shape of the line to be formed is patterned by a process of etching the electrically conductive material. However, there is a limitation in ensuring fineness of the etching process. For this reason, because of a limitation in decreasing an interval between the lines, a large space is required, and an area of the non-display area NA increases, which makes it difficult to implement a narrow bezel.

For example, in case that a single line is used to transmit a single signal, the signal may not be transmitted when the corresponding line cracks.

The line may crack during a process of bending the substrate 110, or a crack occurring on another layer may propagate to the line. In case that the line cracks as described above, a signal to be transmitted may not be transmitted.

Therefore, with reference to FIG. 5, the signal lines 14, which are disposed in the bending portion BA of the display apparatus 1 according to the embodiment of the present specification, may be disposed as two lines, i.e., a first line 171 and a second line 172.

The signal line 14, which is disposed in the bending portion BA of the display apparatus according to the embodiment of the present specification, may be disposed as a single line. The embodiments of the present specification are not limited thereto.

The first line 171 and the second line 172 may be made of an electrically conductive material. The first line 171 and the second line 172 may be made of an electrically conductive material excellent in flexibility to reduce the occurrence of cracks when the flexible substrate 110 is bent.

The first line 171 and the second line 172 may be made of an electrically conductive material, such as gold (Au), silver (Ag), or aluminum (Al), excellent in flexibility. The first line 171 and the second line 172 may be made of one of various electrically conductive materials used in the display area AA. The first line 171 and the second line 172 may also be made of an alloy of molybdenum (Mo), chromium (Cr), titanium (Ti), nickel (Ni), neodymium (Nd), copper (Cu), silver (Ag), and magnesium (Mg). Further, the first line 171 and the second line 172 may each be configured as a multilayer structure including various electrically conductive materials. Alternatively, the first line 171 and the second line 172 may each be configured as a three-layer structure including titanium (Ti)/aluminum (Al)/titanium (Ti). However, the present specification is not limited thereto.

A buffer layer made of an inorganic insulation layer may be disposed below the first line 171 and the second line 172 to protect the first line 171 and the second line 172. A passivation layer made of an inorganic insulation layer may be formed to surround upper portions and lateral portions of the first and second lines 171 and 172. Therefore, it is possible to inhibit the first line 171 and the second line 172 from being corroded by reacting with moisture or the like.

The first line 171 and/or the second line 172 formed in the bending portion BA receive a tensile force when the bending portion BA is bent. As described with reference to FIG. 1, the line, which extends in the direction identical to the bending direction on the substrate 110, may receive the highest tensile force, which may cause cracks. When the crack severely occurs, the line disconnection may occur. Therefore, the line is not formed to extend in the bending direction. At least some of the lines disposed while including the bending portion BA may be formed to extend in an oblique direction different from the bending direction, which may minimize the tensile force and reduce the occurrence of cracks. The shape of the line may be a rhombic shape, a triangular wave shape, a sine wave shape, a trapezoidal shape, or the like. However, the present specification is not limited thereto.

In the embodiment, the first line 171 or the second line 172 may be made of the same material as the source electrode SE and the drain electrode DE in FIG. 4.

For example, the first line 171 may be disposed on the substrate 110, and a first planarization layer **115*c* may be disposed on the first line 171. The second line 172 may be disposed on the first planarization layer 115*c*, and a second planarization layer 115*d* may be disposed on the second line 172. The first planarization layer 115*c* and the second planarization layer 115*d*** may each be made of, but not limited to, one or more materials among acrylic resin, epoxy resin, phenolic resin, polyamide-based resin, polyimide-based resin, unsaturated polyester-based resin, polyphenylene-based resin, polyphenylene sulfide-based resin, and benzocyclobutene. However, the present specification is not limited thereto.

In the embodiment, the first planarization layer 115*c* or the second planarization layer 115*d* may be made of the same material as the planarization layer 115 in FIG. 4.

A micro-coating layer (MCL) 600 may be disposed on the second planarization layer 115*d*.

A tensile force may be applied to the signal line 14 disposed above the substrate 110 during the bending process, which may cause cracks. Therefore, the micro-coating layer 600 is made by coating a position, which is to be bent, with resin with a small thickness to protect the signal line 14.

Figure 6:
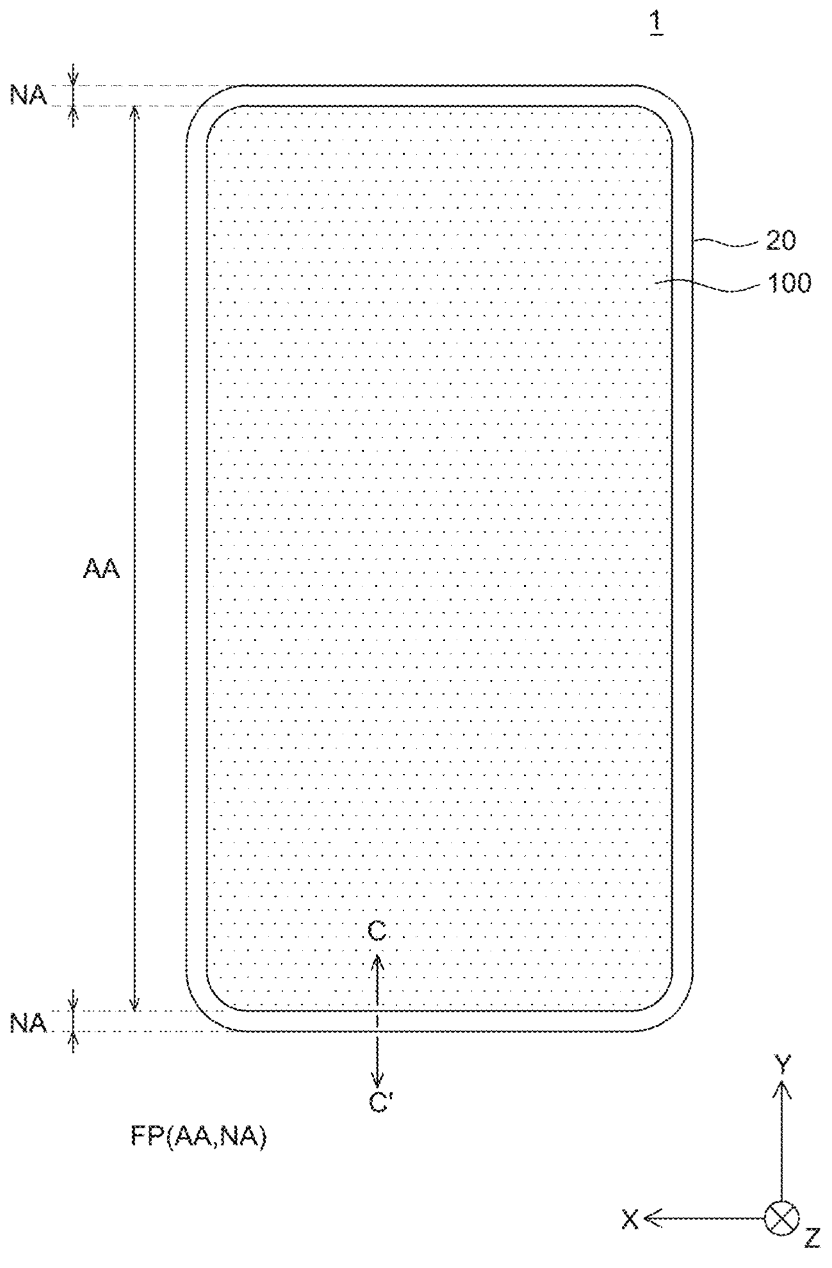
FIG. 6 is a view illustrating a front surface of the display apparatus according to the embodiment of the present specification.

FIG. 6 is a view illustrating a front surface of the display apparatus according to the embodiment of the present specification.

Figure 7:
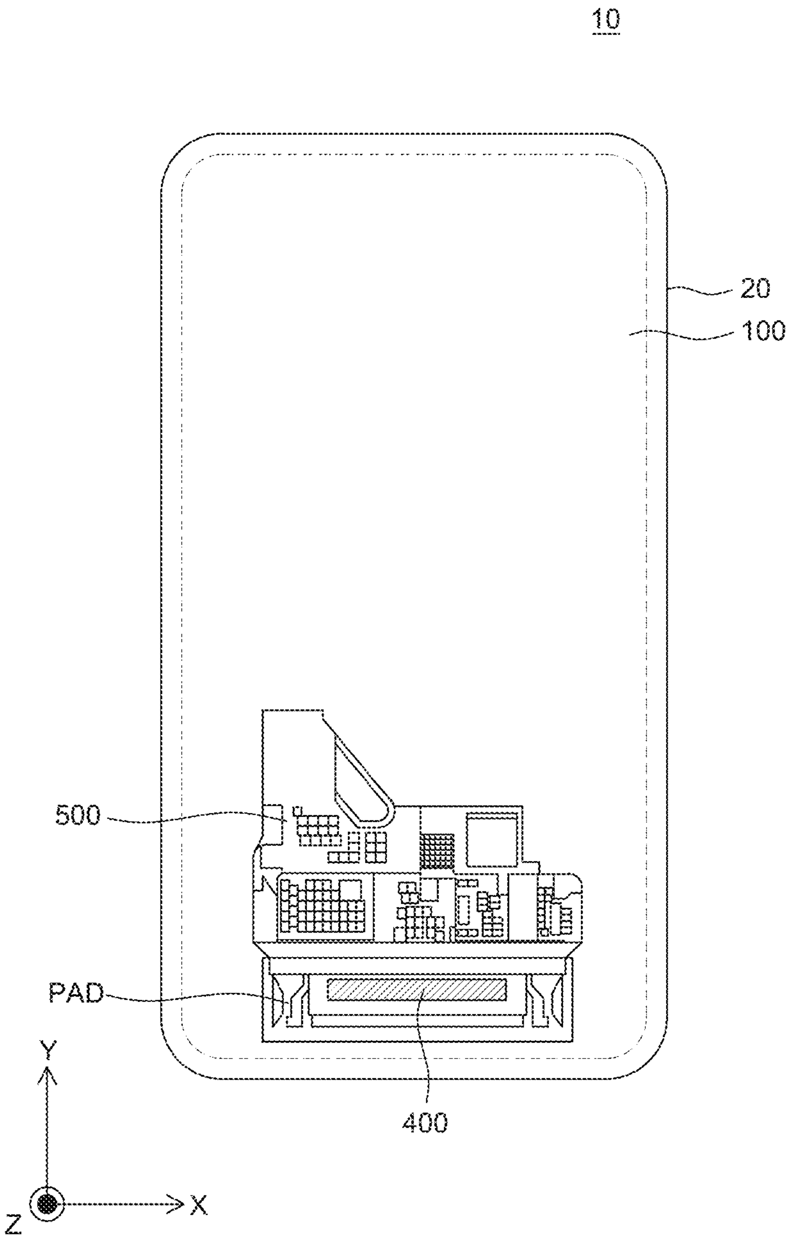
FIG. 7 is a view illustrating a rear surface of a display module of the display apparatus according to the embodiment of the present specification.

FIG. 7 is a view illustrating a rear surface of a display module in a state in which a casing part is removed from the display apparatus according to the embodiment of the present specification.

Figure 8:
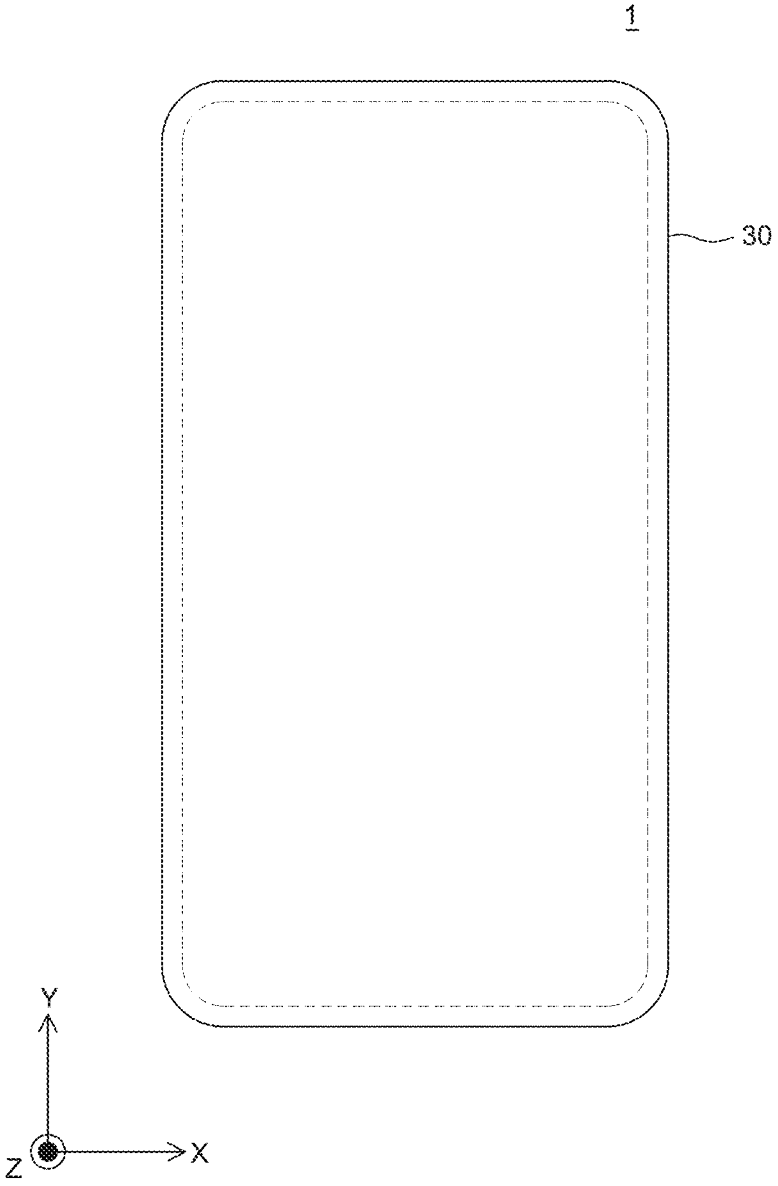
FIG. 8 is a view illustrating a rear surface of the display apparatus according to the embodiment of the present specification.

FIG. 8 is a view illustrating the rear surface of the display apparatus according to the embodiment of the present specification.

A direction of the front surface and upper portion defined in the present specification means a Z-axis direction, and a direction of the rear surface and lower portion means a −Z-axis direction.

With reference to FIGS. 6 to 8, the display apparatus 1 may include a display module 10 including a cover member 20, and the display panel 100 attached to a lower portion of the cover member 20 in a downward direction (−Z-axis).

The cover member 20 may be disposed to cover the front surface of the display apparatus 1 and protect the display apparatus 1 from an external impact.

An edge portion of the cover member 20 may have a curvature portion or a curved portion bent in the direction toward the rear surface of the display apparatus 1.

The cover member 20 may be disposed to cover a side surface area of the display apparatus 1 disposed on the rear surface. Therefore, even in the case of the side surface as well as the front surface of the display apparatus 10, the cover member 20 may protect the display panel 100 from an external impact.

The cover member 20 may overlap the display area AA that displays images. For example, the cover member 20 may be made of a transparent plastic material capable of transmitting images or configured as cover glass made of a transparent glass material. The present specification is not limited thereto.

A casing part 30 may be disposed on the rear surface of the display module 10 and support the cover member 20.

The casing part 30 may serve as a housing for protecting the rear surface of the display apparatus 1 and serve as a casing that defines an outermost periphery of the display apparatus 1.

The casing part 30 may be made of various materials such as plastic, metal, or glass.

A middle frame part may be additionally disposed between the cover member 20 and the casing part 30.

The middle frame part may be disposed on the rear surface of the display module 10 to accommodate the display module 10. The middle frame part may be in contact with the cover member 20 to support the cover member 20.

The middle frame part may serve as a housing for protecting the rear surface of the display module 10.

The display module 10 may be disposed on one surface of the middle frame part.

Additional constituent components, such as a battery for applying power to operate the display apparatus 1, may be disposed on the other surface of the middle frame part.

Figure 9:
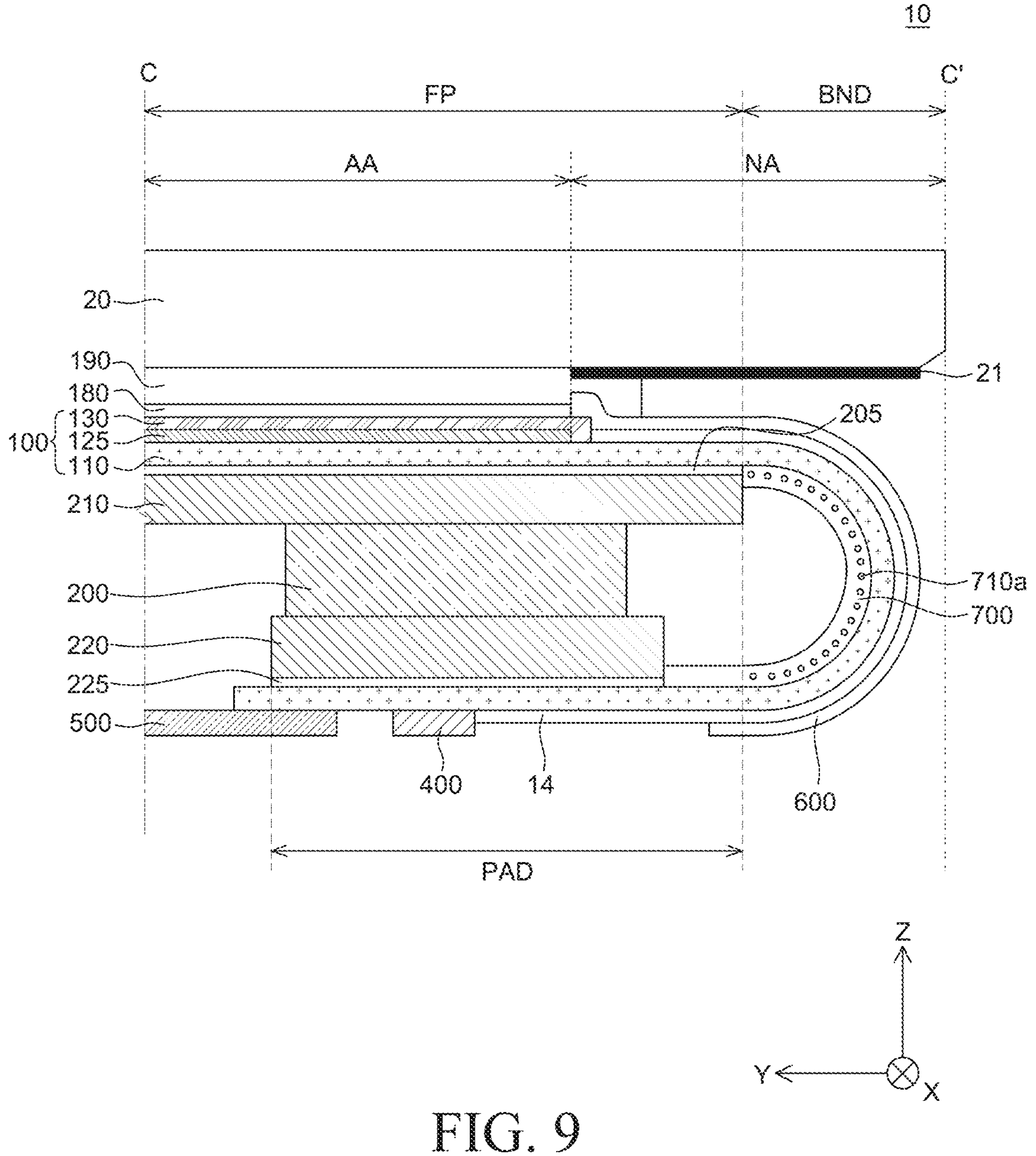
FIG. 9 is a cross-sectional view taken along line C-C' in FIG. 6 according to the embodiment of the present specification.

FIG. 9 is a cross-sectional view taken along line C-C' in FIG. 6 according to the embodiment of the present specification.

With reference to FIG. 9, a front surface portion FP of the display panel 100 may be disposed below the cover member 20.

The pixel having the plurality of light-emitting elements and the driving transistor may be disposed in the front surface portion FP, and a pixel array part 125, which includes a signal line for transmitting a driving signal to the pixel, may be disposed in the front surface portion FP, such that images may be displayed.

The front surface portion FP may include the display area AA (active area) in which images are displayed, and the non-display area NA (non-active area) that is an area excluding the display area AA. The non-display area NA may be formed in an edge area that surrounds the display area AA.

The display area AA and the non-display area NA may also be applied to the cover member 20 in the same way.

An area of the cover member 20, which transmits images, may be the display area AA.

An area, which surrounds the display area AA and does not transmit images, may be the non-display area NA.

The non-display area NA may be defined as a bezel area.

The display panel 100 disposed below the cover member 20 may include a bending portion BND extending from one side of the front surface portion FP and bent in the downward direction.

The bending portion BND may be positioned at an outermost periphery of the display panel 100 and easily exposed to an external impact. When an impact is applied to the bending portion BND, the bending portion BND may be easily deformed or damaged. Therefore, a support layer or a reinforcement member for protecting the bending portion BND may be added to absorb an impact.

The display apparatus 1 may include the display panel 100, and the cover member 20 disposed on the display panel 100.

The display module 10 of the display apparatus 1 may include at least one of the display panel 100 including the front surface portion FP, the bending portion BND, and a pad part PAD bent from the bending portion BND and positioned on the rear surface of the front surface portion FP, support members 210 and 220 configured to support the display panel 100, and a connection member 200 configured to fix the display panel 100 and the support members 210 and 220.

A first support member 210, the connection member 200, a second support member 220, and the pad part PAD may be sequentially disposed below the front surface portion FP of the display panel 100.

A first fixing member 190 may be disposed between the cover member 20 and the display panel 100.

The first fixing member 190 may connect or couple the cover member 20 and the display panel 100.

For example, the first fixing member 190 may be a fixing member, a bonding layer, or an adhesive layer, but the present specification is not limited by the term.

The first fixing member 190 may be disposed to overlap the display area AA.

Therefore, the first fixing member 190 may be made of a material that may transmit images from the display panel 100.

For example, the first fixing member 190 may include or be made of a material such as a pressure sensitive adhesive (PSA), a transparent bonding agent (optical clear adhesive (OCA)), or resin (optical clear resin (OCR)). The present specification is not limited thereto.

The display panel 100 disposed below the cover member 20 may include the front surface portion FP, the bending portion BND, and the pad part PAD based on the substrate 110.

The front surface portion FP of the display panel 100 may be disposed below the first fixing member 190. For example, the front surface portion FP may be a portion on which images are displayed. The front surface portion FP may include the substrate 110, the pixel array part 125, the encapsulation part 130, and an optical film 180.

The bending portion BND of the display panel 100 may be a portion extending from one side of the front surface portion FP, bent in the downward (−Z-axis) direction, and then bent in a plane (Y-axis) direction. The bending portion BND may include the display substrate 110 and the signal line 14.

The pad part PAD of the display panel 100 may extend from the bending portion BND and disposed below the front surface portion FP.

The pad part PAD may include the substrate 110, the signal line 14, and a pad electrode connected to the signal line 14. A drive circuit part 400 or a flexible circuit board 500 may be mounted on and electrically connected to the pad electrode to operate the pixel.

The optical film 180 may be disposed above the front surface portion FP of the display panel 100. For example, a functional layer may be further disposed between the first fixing member 190 and the optical film 180 to improve the display performance of the display apparatus.

The optical film 180 may suppress reflection of an external light and improve outdoor visibility and a contrast ratio related to images displayed on the display panel 100. For example, the optical film 180 may be a polarizing plate including a polarizer and a protective film configured to protect the polarizer. The optical film 180 may be formed by applying a polarizing material to ensure flexibility.

The display panel 100 may include the substrate 110, the pixel array part 125 disposed on the substrate 110, and the encapsulation part 130 disposed to cover the pixel array part 125.

The substrate 110 may be disposed on a lowermost portion of the display panel 100.

The substrate 110 may be formed in all the front surface portion FP, the bending portion BND, and the pad part PAD.

The substrate 110 may be made of a plastic material having flexibility and have flexible properties.

The substrate 110 may include polyimide and be made of a glass material having flexibility and a small thickness.

The pixel array part 125 may be disposed on the substrate 110. The pixel array part 125 may display images. A portion on which the pixel array part 125 is disposed may be the display area AA.

Therefore, an area, which corresponds to the pixel array part 125 based on the cover member 20, may be the display area AA, and an area, which excludes the display area AA, may be the non-display area NA.

The pixel array part 125 may include a light-emitting element, a thin-film transistor configured to operate the light-emitting element, and signal lines such as a gate line, a data line, and a pixel driving power line provided on the substrate 110.

The pixel array part 125 may include a pixel that displays images in accordance with signals supplied to the signal lines, and the pixel may include the light-emitting element and the thin-film transistor.

The light-emitting element may include an anode electrode electrically connected to the thin-film transistor, a light-emitting layer formed on the anode electrode, and a cathode electrode configured to supply a common voltage.

The thin-film transistor may include a gate electrode, a semiconductor layer, a source electrode, a drain electrode, and the like.

The semiconductor layer of the thin-film transistor may include silicon such as a-Si, poly-Si, or low-temperature poly-Si or include oxide such as indium-gallium-zinc-oxide (IGZO). The present specification is not limited thereto.

In each of the pixel areas, the anode electrode may be disposed to correspond to an opening area provided in accordance with a pattern shape of the pixel, and the anode electrode may be electrically connected to the thin-film transistor.

The light-emitting element may include the light-emitting layer formed between the anode electrode and the cathode electrode.

The light-emitting layer may be implemented to emit light with the same color, such as white light, for each pixel. Alternatively, the light-emitting layer may be implemented to emit light with different colors, such as red light, green light, or blue light, for each pixel.

The encapsulation part 130 may be disposed on the substrate 110 and cover the pixel array part 125.

The encapsulation part 130 may suppress the penetration of oxygen, moisture, or foreign substances into the light-emitting layer of the pixel array part 125.

The encapsulation part 130 may have a multilayer structure in which organic material layers and inorganic material layers are alternately stacked. The present specification is not limited thereto.

The front surface portion FP of the display panel 100 may include the substrate 110, the pixel array part 125, and the encapsulation part 130 and be formed in a flat state, except for a rim portion thereof.

In order to maintain the flat state of the front surface portion FP, the first support member 210 to be described below may be connected or coupled to a lower portion of the front surface portion FP.

The bending portion BND of the display panel 100 may be a portion in which the substrate 110 may be disposed without disposing the pixel array part 125, the encapsulation part 130, and the first support member 210 to be described below. The bending portion BND may be a portion that may be easily bent in a desired direction by a user.

The pad part PAD of the display panel 100 may be a portion in which the pixel array part 125 and the encapsulation part 130 are not disposed.

In order to maintain the flat state of the pad part PAD, the second support member 220 may be connected or coupled to a lower portion of the pad part PAD.

For example, the front surface portion FP of the display panel 100 may be disposed in a direction in which a screen is displayed. The pad part PAD may be bent from the bending portion BND in the downward direction of the front surface portion FP and positioned in the downward direction of the front surface portion FP, e.g., positioned on the rear surface of the front surface portion FP.

The support members 210 and 220 may be disposed below the substrate 110 of the display area AA.

The support members 210 and 220 may include the first support member 210 and the second support member 220.

The first support member 210, which is disposed below the front surface portion FP of the display panel 100, and the second support member 220, which is disposed below the pad part PAD, may be disposed below the substrate 110, and may maintain the flat state of the front surface portion FP when reinforcing the rigidity of the substrate 110.

The first support member 210 and the second support member 220 may be formed to have predetermined strength and thickness to reinforce the rigidity of the substrate 110. The first support member 210 and the second support member 220 may not be formed in an area of the bending portion BND in which the bending portion BND is positioned.

Based on a shape made before the display panel 100 is bent, the first support member 210 and the second support member 220 may be disposed below the substrate 110 and spaced apart from each other.

For example, based on a shape made after the display panel 100 is bent, the first support member 210 may be disposed below the front surface portion FP, and the second support member 220 may be disposed above the pad part PAD.

The first support member 210 and the second support member 220 may each be a backplate disposed on the rear surface of the substrate 110.

The first support member 210 and the second support member 220 may each be configured as a thin plastic film having rigidity.

For example, the first support member 210 and the second support member 220 may be made of polyethylene terephthalate (PET), polyimide (PI), polyethylene naphthalate (PEN), and the like. The present specification is not limited thereto.

In the embodiment, the first support member 210 and the second support member 220 may be made of the same material and have the same thickness. The present specification is not limited thereto.

Based on the shape made after the display panel 100 is bent, the connection member 200 may be disposed between the first support member 210 and the second support member 220.

In case that the bending portion BND is bent so that the pad part PAD of the display panel 100 is disposed below the front surface portion FP of the display panel 100, a restoring force, which returns the bending portion BND back to a state made before the bending portion BND is bent, may be strongly applied to the display panel 100.

In case that the restoring force is applied strongly, the pad part PAD of the bent display panel 100 may be separated without being fixed.

The connection member 200 may serve as a fixing member to fix and maintain a bent shape of the bent display panel 100.

The connection member 200 may be formed to have a predetermined thickness in a thickness direction to maintain a predetermined curvature of the bending portion BND.

The connection member 200 may be a double-sided tape having an adhesive force capable of fixing the first support member 210 and the second support member 220. The present specification is not limited thereto.

For example, the connection member 200 may include or be made of a material such as a pressure sensitive adhesive (PSA), a transparent bonding agent (optical clear adhesive (OCA)), or resin (optical clear resin (OCR)). The present specification is not limited thereto.

For example, the connection member 200 may be configured as a foam tape or foam pad having an adhesive force and further mitigate an impact.

The second support member 220 may be disposed below the connection member 200.

In order to dispose the second support member 220, the second support member 220 may be attached to a bottom surface of the pad part PAD of the substrate 110, the bending portion BND may be bent, and the second support member 220 may be attached and fixed to a bottom surface of the connection member 200.

In a state in which the second support member 220 is fixed to the connection member 200, the second support member 220 may be structured to be disposed on the pad part PAD of the substrate 110.

In the state in which the second support member 220 is fixed to the connection member 200, an outer portion, i.e., a top surface of the bending portion BND may be exposed to the outside, and a bottom surface, i.e., an inner portion of the bending portion BND may be disposed to be directed toward a side surface of the connection member 200.

The micro-coating layer 600 may be disposed on the top surface, i.e., the outer portion of the bending portion BND of the display panel 100. The micro-coating layer 600 may be disposed on the substrate 110 while including the bending portion BND.

The micro-coating layer 600 may extend to cover at least a partial area of the front surface portion FP and at least a partial area of the pad part PAD while covering the bending portion BND.

The micro-coating layer 600 may include resin. For example, the micro-coating layer 600 may include ultraviolet ray (UV) curable acrylic-based resin. The present specification is not limited thereto.

The micro-coating layer 600 may cover various types of signal lines 14 disposed between the pad part PAD and the encapsulation part 130 of the display panel 100, which may suppress the penetration of moisture into the signal lines while protecting the signal lines from an external impact.

The other constituent elements, except for the substrate 110 and the signal lines, may be excluded from the bending portion BND to improve the flexibility of the display panel 100, such that the micro-coating layer 600 may reinforce the rigidity of the bending portion BND from which the other constituent elements are excluded.

For example, the drive circuit part 400 may be disposed on the other surface of the pad part PAD of the display panel 100 having one surface on which the second support member 220 is disposed.

The drive circuit part 400 may be disposed and mounted on the substrate 110 in a chip-on-plastic (COP) or chip-on-film (COF) manner. However, the present specification is not limited thereto.

The drive circuit part 400 may generate data signals and gate control signals on the basis of image data and timing synchronizing signals supplied from an external host drive system.

The drive circuit part 400 may supply the data signal to the data line of each of the pixels through the pad part PAD of the display panel 100 and supply the gate control signal to the gate drive circuit part.

The drive circuit part 400 may be mounted in a chip mounting area defined on the substrate 110. The drive circuit part 400 may be electrically connected to the pad part PAD of the display panel 100 and respectively connected to the gate drive circuit part, which is disposed on the substrate 110, and the signal line of the pixel array part 125.

The pad part PAD may be disposed at an end of the substrate 110 on which the drive circuit part 400 is mounted.

The pad part PAD may be disposed on one surface of the substrate 110 and electrically connected to the flexible circuit board 500 on which the circuit board is mounted.

The flexible circuit board 500 may be positioned on the rear surface of the display panel 100 by being electrically connected to the pad part PAD provided at the end of the substrate 110 by a film attachment process using a conductive bonding layer.

For example, the conductive bonding layer may be a conductive film such as an anisotropic conductive film (ACF).

The circuit board may provide the drive circuit part 400 with the image data and the timing synchronizing signal supplied from the host drive system, and the circuit board may provide voltages required to operate the pixel array part 125, the gate drive circuit part, and the drive circuit part 400.

As an example, FIG. 9 illustrates a cross-section of the display module of the display apparatus according to the embodiment of the present specification taken along line C-C'. This configuration may also be applied to a cross-section of a left edge and a cross-section of an upper edge. The embodiments of the present specification are not limited thereto.

The display apparatus according to the embodiment of the present specification may include the cover member 20, and the display panel 100 disposed on one surface of the cover member 20.

For example, the display apparatus may include the first fixing member 190 disposed between the cover member 20 and the display panel 100. An end of the first fixing member 190 may be disposed to be positioned outward of the end of the display area AA of the display panel 100. For example, because the first fixing member 190 serves to bond the cover member 20 and the display panel 100, the first fixing member 190 may be disposed so as not to protrude from the end of the cover member 20. For example, the end of the first fixing member 190 may be positioned between the end of the cover member 20 and the display area AA of the display panel 100. For example, an area of the display area AA of the display panel 100 may be smaller than an area of the first fixing member 190.

As illustrated in FIG. 9, because the first fixing member 190 may be disposed to overlap the display area AA, the first fixing member 190 may be made of a material that may transmit images from the display panel 100. For example, the first fixing member 190 may include or be made of a material such as an optical clear adhesive (OCA), optical clear resin (OCR), or a pressure sensitive adhesive (PSA). The present specification is not limited thereto.

The first support member 210 may be disposed below the substrate 110 to maintain the flat state of the display substrate 110 while reinforcing the rigidity of the substrate 110. A second fixing member 205 may be disposed, fixed, or bonded between the substrate 110 and the first support member 210.

For example, a third fixing member 225 may be disposed, fixed, or bonded between the substrate 110 and the second support member 220.

The second fixing member 205 and/or the third fixing member 225 may be a fixing member, and at least one surface of the second fixing member 205 and/or the third fixing member 225 may be an adhesive agent or a bonding agent.

The second fixing member 205 and/or the third fixing member 225 may each include or be made of a material such as a pressure sensitive adhesive (PSA), a transparent bonding agent (optical clear adhesive (OCA)), or resin (optical clear resin (OCR)). The present specification is not limited thereto.

For example, the second fixing member 205 and/or the third fixing member 225 may each be a double-sided adhesive agent.

Light-blocking patterns 21 may be formed on four surfaces of the edge of the cover member 20. For example, the light-blocking pattern 21 may be formed at an edge of the rear surface of the cover member 20. In the embodiment, the light-blocking pattern 21 may be formed to partially overlap the first fixing member 190, the optical film 180, and the display panel 100 disposed below the light-blocking pattern 21. For example, the light-blocking pattern 21 may be formed to overlap a part of the bending portion BND.

For example, the light-blocking pattern 21 may include a black material, such as a black ink or a black pigment, having low permeability to define a rim of the display area AA.

In the embodiment, the light-blocking pattern 21 may be made of chromium (Cr) or graphite.

According to the embodiment of the present specification, the substrate 110 may include the display area AA and the non-display area NA, and the non-display area NA may include the bending portion BND.

According to the embodiment of the present specification, a reinforcement member 700 may be provided in the bending portion BND and disposed below the substrate 110. The reinforcement member 700 may include rigid parts 710*a*. A modulus (or elastic modulus) of the rigid part 710*a* may be different from a modulus of the substrate 110. The reinforcement member 700 of the display apparatus 1 according to the embodiment of the present specification may include the rigid part 710*a* having a larger modulus than the substrate 110, which may reinforce the rigidity of the substrate 110 in the bending portion BND. Therefore, it is possible to minimize a short circuit and cracks of the signal line 14 in the bending portion BND and minimize an operational defect of the display apparatus 1.

Figure 10:
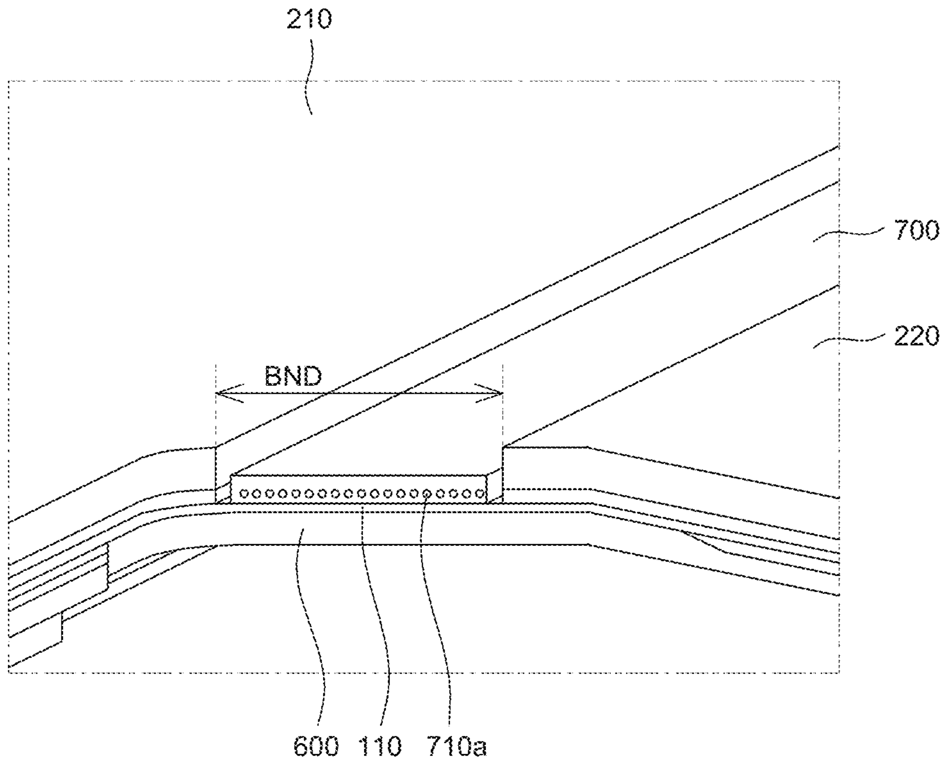
FIG. 10 is an enlarged view of a rear surface of a bending portion before the display apparatus according to the embodiment of the present specification is bent.

FIG. 10 is an enlarged view of the rear surface of the bending portion before the display apparatus according to the embodiment of the present specification is bent.

With reference to FIG. 10, according to the embodiment of the present specification, the reinforcement member 700 including the rigid part 710*a* may be disposed on and attached to the lower portion of the substrate 110 before the bending portion BND of the substrate 110 is bent. Before the bending process, the reinforcement member 700 may be disposed between the first support member 210 and the second support member 220.

Figure 11:
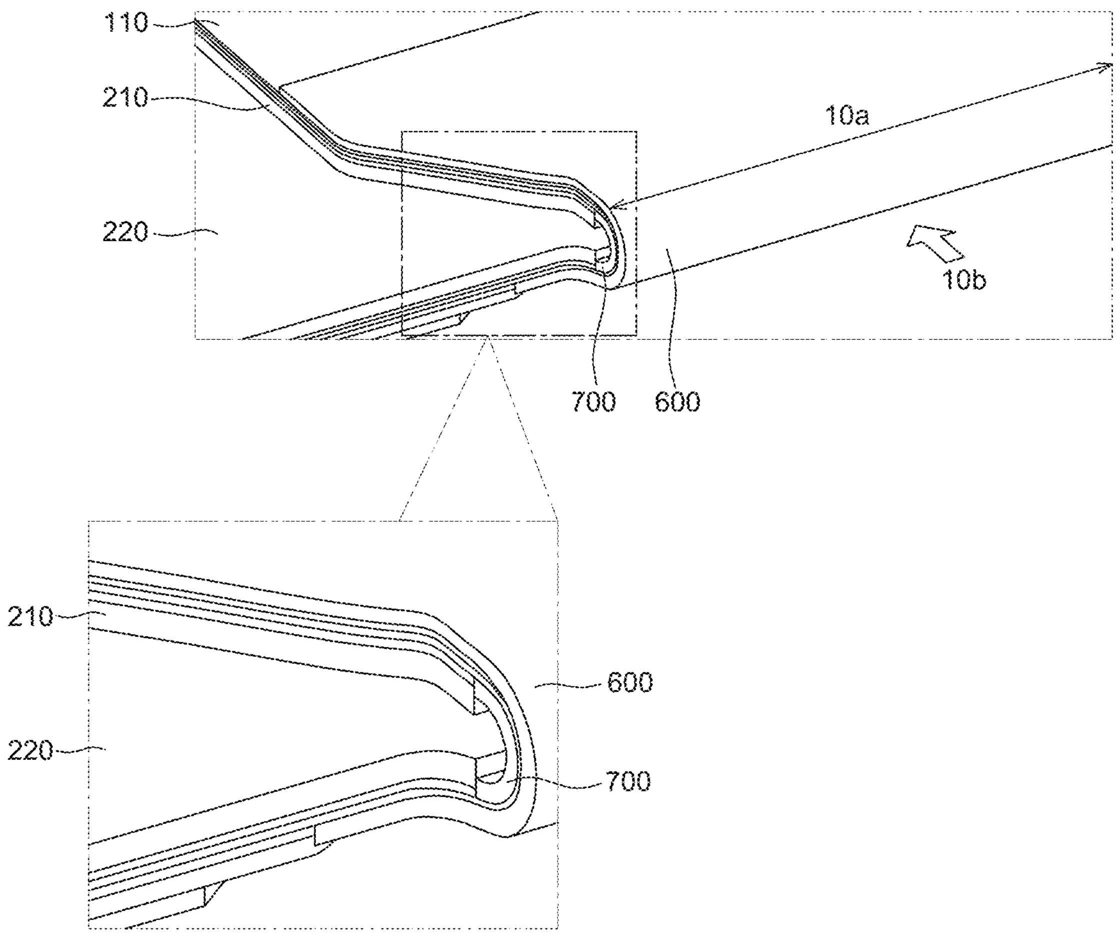
FIG. 11 is an enlarged view of the rear surface of the bending portion after the display apparatus according to the embodiment of the present specification is bent.

FIG. 11 is an enlarged view of the rear surface of the bending portion after the display apparatus according to the embodiment of the present specification is bent.

With reference to FIG. 11, the display apparatus 1 according to the embodiment of the present specification may be pushed by receiving an external force in a second direction 10*b* after the bending process. The display apparatus 1 according to the embodiment of the present specification may include the reinforcement member 700 between the lower portion of the substrate 110 and the support members 210 and 220. Therefore, it is possible to minimize line disconnection or cracks of the signal line 14 in FIG. 3 by reinforcing the rigidity related to the axis of the bending portion BND in a first direction 10*a* against an external force of the second direction 10*b*.

Figure 12:
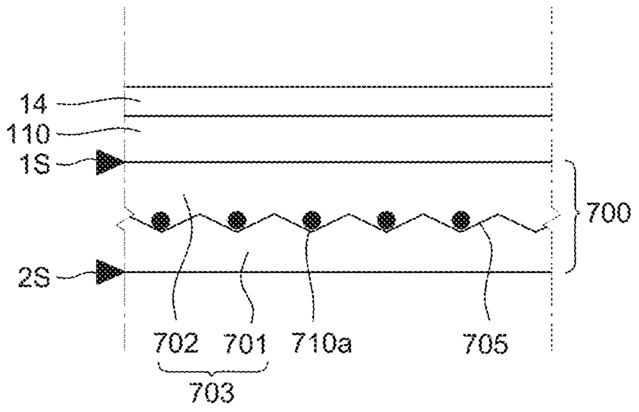
FIG. 12 is a cross-sectional view illustrating a reinforcement member and a substrate of the display apparatus according to the embodiment of the present specification.

FIG. 12 is a cross-sectional view illustrating the reinforcement member and the substrate of the display apparatus according to the embodiment of the present specification.

With reference to FIG. 12, according to the embodiment of the present specification, at least one rigid part 710*a* or a plurality of rigid parts 710*a*, which overlaps the bending portion BND, may be provided. In case that the plurality of rigid parts 710*a* is provided, the plurality of rigid parts 710*a* may be disposed to be spaced apart from one another.

The reinforcement member 700 in the bending portion BND requires flexibility so that the bending portion BND is bent, and the reinforcement member 700 requires the rigidity to suppress a short circuit of the signal line 14. Therefore, for example, the plurality of rigid parts 710*a* may be disposed to be spaced apart from one another to ensure both the flexibility and the rigidity. For example, the rigid parts 710*a* may be disposed at uniform (equal) intervals. For example, in case that the rigid parts 710*a* are disposed non-uniformly, the imbalance may occur, which may increase the probability of defects. Therefore, the rigid parts 710*a* may be uniformly, which may minimize a defect. The embodiments of the present specification are not limited thereto.

In the embodiment, the reinforcement member 700 may include an opening portion. The embodiments of the present specification are not limited thereto.

With reference to FIGS. 3, 9, and 12, the signal line 14 may be provided in the display area AA on the substrate 110 and extend to the bending portion BND, and the signal line 14 and the rigid part 710*a* may overlap each other. The rigid parts 710*a* may be disposed to be spaced apart from the cover member 20 toward the pad part PAD in a direction from the upper side to the lower side, which may ensure both the flexibility and the rigidity. For example, the signal line 14 and the rigid part 710*a* may be disposed in different directions. The signal line 14 and the rigid part 710*a* may be disposed to intersect in the vertical direction. Because the signal line 14 may be disposed in the bending direction, the rigid parts 710*a* are disposed to be spaced apart from one another in a direction instead of the bending direction, which may support and protect the substrate 110 in the bending portion BND. Therefore, it is possible to minimize a short circuit and cracks of the signal line 14.

With reference to FIGS. 9 and 12, a first surface 1S, which is one surface of the reinforcement member 700, may be an adhesive portion (attachment portion) attached to the substrate 110, and a second surface 2S, which is the other surface of the reinforcement member 700, may be a non-adhesive portion.

The rigid part 710*a* may include at least one of metal and plastic to have rigidity. For example, the rigid part 710*a* may include metal such as steel, aluminum, or stainless steel (SUS) to have rigidity or include plastic in consideration of processability. The rigid part 710*a* may be a core with a circular shape or have a cylindrical shape. In an embodiment, the rigid part(s) 710*a* are one or more rods with a selected shape that extend through the reinforcement member 700 to increase the rigidity of the reinforcement member 700, as best shown in FIG. 15D. The rigid parts 710*a* may also have any other selected shape or configuration, and may be, in some additional non-limiting examples, strips of material, rods of material, sections of material, parts of material, layers of material in a multi-layer stack or laminate, and others. The embodiments of the present specification are not limited thereto.

With reference to FIG. 12, the reinforcement member 700 may include a support layer 703.

The support layer 703 may be configured as a single layer or at least two layers. The support layer 703 may include a first support layer 701 and a second support layer 702. In the embodiment, the rigid parts 710*a* may be disposed between the first support layer 701 and the second support layer 702.

The first support layer 701 may be a base portion, and the second support layer 702 may be an adhesive portion. The second support layer 702 may be disposed on the first support layer 701, and the first surface 1S, which is at least one surface, may be attached or bonded to the substrate 110.

Curved portions 705 may be provided between the first support layer 701 and the second support layer 702 and include a plurality of inclined portions and a plurality of concave portions. The rigid parts 710*a* may be disposed in the concave portions of the plurality of curved portions 705. For example, the rigid parts 710*a* may be disposed on the plurality of curved portions 705. The embodiments of the present specification are not limited thereto.

The first support layer 701 and the second support layer 702 may be different in materials.

For example, the first support layer 701 may be a base portion and made of a material having flexibility. The first support layer 701 may be made of polyethylene terephthalate (PET), polyimide (PI), polyethylene naphthalate (PEN), and the like. The present specification is not limited thereto. For example, the first support layer 701 may be made of the same material as the support members 210 and 220. The embodiments of the present specification are not limited thereto.

For example, because the first support layer 701 needs to be bent in the bending portion BND, the first support layer 701 may have a smaller thickness than the support members 210 and 220.

For example, the second support layer 702 may be an adhesive portion and fix the rigid part 710*a* and the substrate 110. The second support layer 702 may be an adhesive agent. The second support layer 702 may include or be made of a material such as a pressure sensitive adhesive (PSA), a transparent bonding agent (optical clear adhesive (OCA)), or resin (optical clear resin (OCR)). The present specification is not limited thereto.

With reference to FIGS. 9 and 12, according to the embodiment of the present specification, in the bending portion BND, the rigid parts 710*a* may be disposed on the first support layer 701, the second support layer 702 may be disposed on the rigid parts 710*a*, the substrate 110 may be disposed on the second support layer 702, the signal line 14 may be disposed on the substrate 110, and the micro-coating layer 600 may be disposed on the signal line 14.

According to the embodiment of the present specification, in the bending portion BND, the substrate 110 may be disposed on the reinforcement member 700, the signal line 14 may be disposed on the substrate 110, and the micro-coating layer 600 may be disposed on the signal line 14.

In the embodiment, a modulus of the rigid part 710*a* and a modulus of the support layer 703 may be different from each other. The modulus of the rigid part 710*a* may be larger than the modulus of the support layer 703. For example, a modulus of the rigid part 710*a* and a modulus of the second support layer 702 may be different from each other. The modulus of the rigid part 710*a* may be larger than the modulus of the second support layer 702.

For example, because the second support layer 702 uses the adhesive agent, the second support layer 702 may have flexibility and facilitate process control. The rigid part 710*a* may have a large modulus and high rigidity. Therefore, it is possible to ensure the flexibility of the bending portion BND and reinforce the rigidity of the circuit line 14, which may suppress a short circuit and cracks of the line.

In the embodiment, the second fixing member 205 and/or the third fixing member 225 disposed between the substrate 110 and the support members 210 and 220 may be adhesive agents and include or be made of the same material as the second support layer 701. The present specification is not limited thereto.

Figure 13:
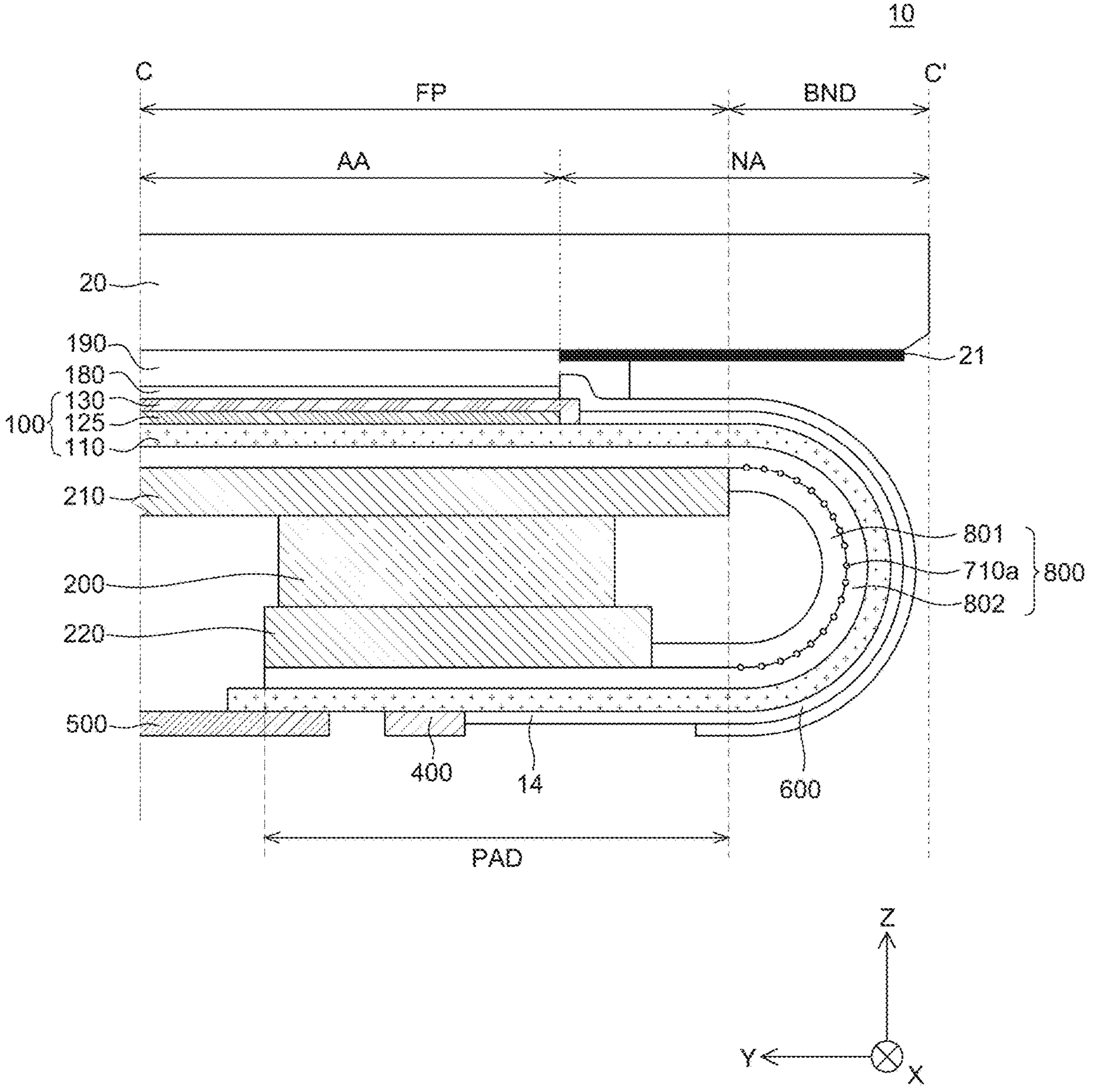
FIG. 13 is a cross-sectional view taken along line C-C' in FIG. 6 according to another embodiment of the present specification.

FIG. 13 is a cross-sectional view taken along line C-C' in FIG. 6 according to another embodiment of the present specification.

In comparison with the embodiment in FIG. 9, the embodiment in FIG. 13 may have the identical constituent elements, except for a reinforcement member 800. A description of the redundant configurations will be omitted.

With reference to FIG. 13, the reinforcement member 800 according to another embodiment of the present specification may include a first support layer 801, a second support layer 802, and the rigid part 710*a*.

For example, the first support layer 801 may be a base portion and made of a material having flexibility.

The first support layer 801 may be made of polyethylene terephthalate (PET), polyimide (PI), polyethylene naphthalate (PEN), and the like. The present specification is not limited thereto.

The second support layer 802 may be a fixing member, and at least one surface of the second support layer 802 may be an adhesive agent. The embodiments of the present specification are not limited thereto.

The second support layer 802 may include or be made of a material such as a pressure sensitive adhesive (PSA), a transparent bonding agent (optical clear adhesive (OCA)), or resin (optical clear resin (OCR)). The present specification is not limited thereto. For example, the second support layer 802 may be a double-sided adhesive agent.

In the embodiment, the second support layer 802 may extend to the bending portion BND from the lower portion of the substrate 110 that overlaps the display area AA. For example, the second support layer 802 may extend to the pad part PAD and overlap a lower portion of the second support member 220.

For example, the second support layer 802 may be a fixing member. The fixing member may be provided between the substrate 110 and the support members 210 and 220, and may extend to the bending portion BND.

Because the second support layer 802 extends to the bending portion BND in the display area AA, an additional process for the bending portion BND may be eliminated, and the separation of the adhesive agent in the bending portion BND may be minimized.

Figure 14A:
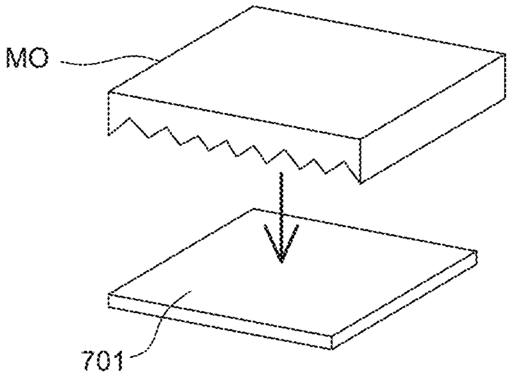
FIGS. 14A to 14C are views for explaining a method of manufacturing the reinforcement member according to the embodiment of the present specification.
Figure 14B:
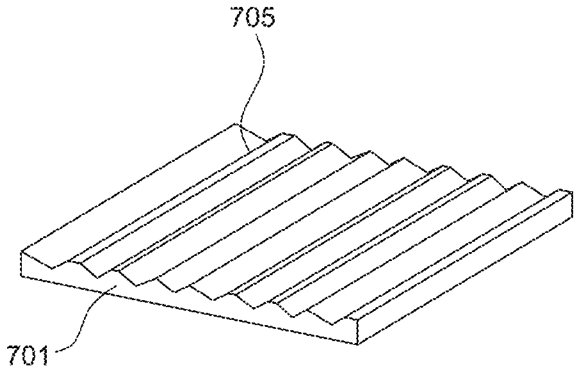
Figure 14C:
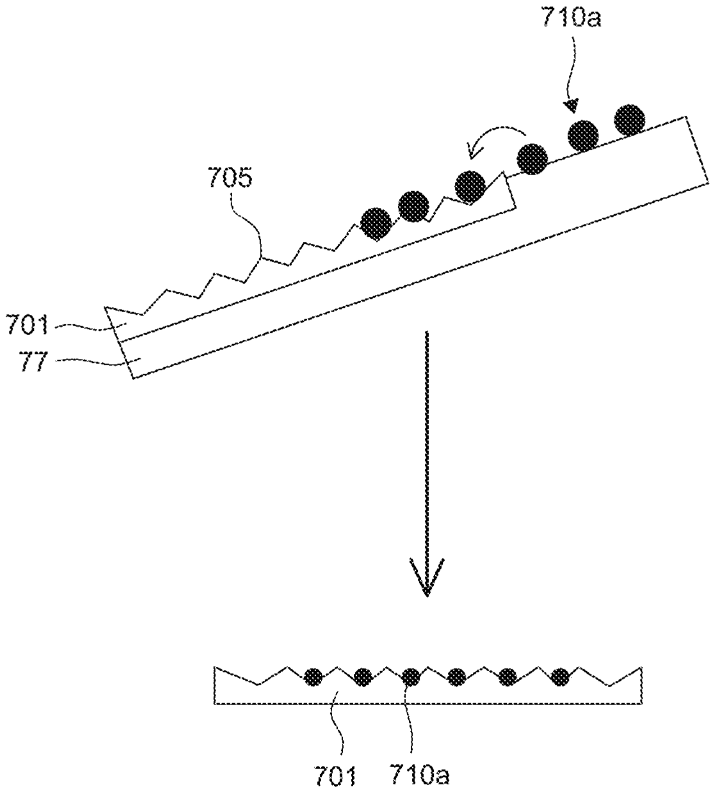

FIGS. 14A to 14C are views for explaining a method of manufacturing the reinforcement member according to the embodiment of the present specification.

With reference to FIG. 14A, a mold MO having curved portions including concave portions may push the first support layer 701 in a third direction (e.g., the Z-axis direction).

With reference to FIG. 14B, the concave curved portions 705 may be formed on the first support layer 701 by the mold MO.

With reference to FIG. 14C, the first support layer 701 may be disposed on a base frame 77, and then the base frame 77 may be inclined at a predetermined angle. Thereafter, the rigid parts 710*a* are rolled on the base frame 77 and the first support layer 701 from above to below, such that the rigid parts 710*a* may be disposed on the first support layer 701. With reference to FIG. 12, the reinforcement member 700 may be attached to the lower portion of the substrate 110.

FIGS. 15A to 15D are views for explaining a method of manufacturing the reinforcement member according to another embodiment of the present specification.

Figure 15A:
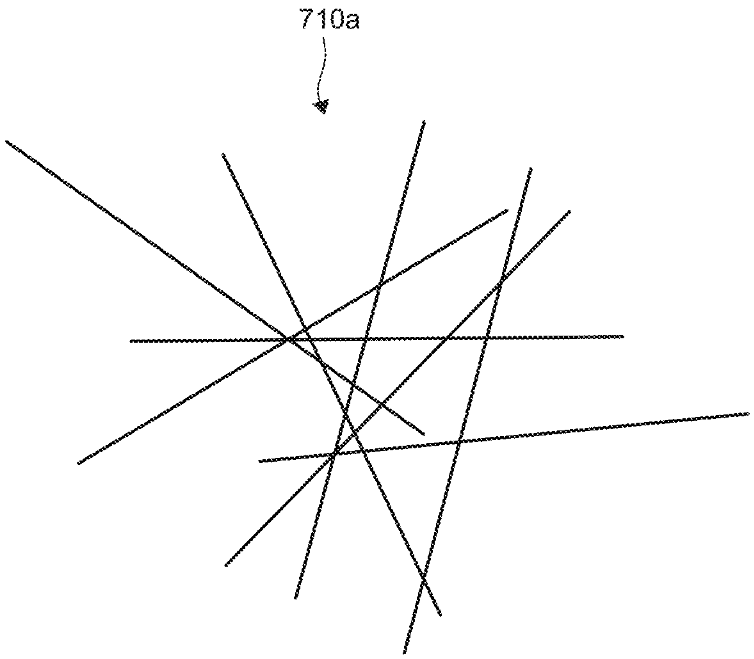
FIGS. 15A to 15D are views for explaining a method of manufacturing a reinforcement member according to another embodiment of the present specification.

With reference to FIG. 15A, the rigid parts 710*a* according to the embodiment may be disposed randomly. For example, the rigid part 710*a* may be made of a conductive material.

Figure 15B:
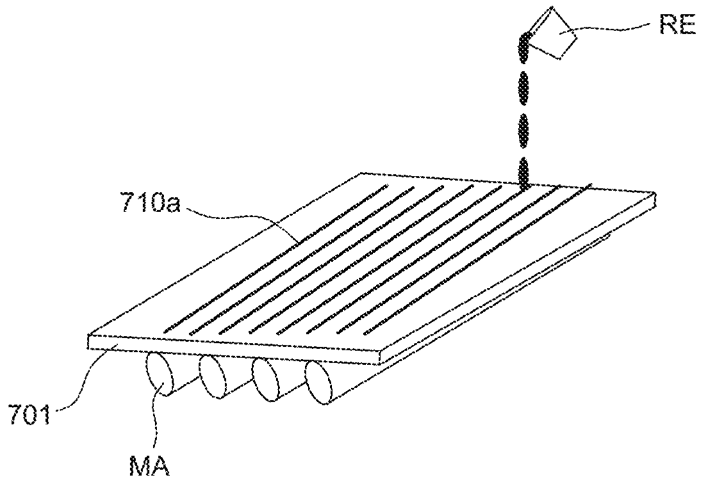

With reference to FIG. 15B, a plurality of magnets MA may be disposed at uniform intervals below the first support layer 701, and then the plurality of rigid parts 710*a* may be arranged and disposed at uniform intervals on the first support layer 701 by a magnetic force. Thereafter, resin RE may be applied onto the first support layer 701 and the rigid part 710*a*. The resin RE may be the second support layer 702 in FIG. 15C.

Figure 15C:
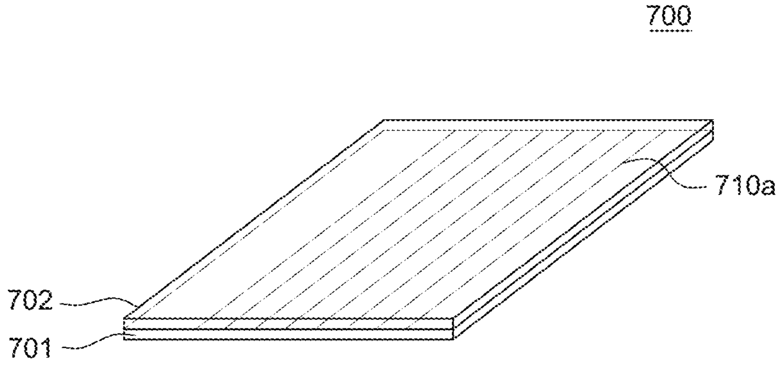
Figure 15D:
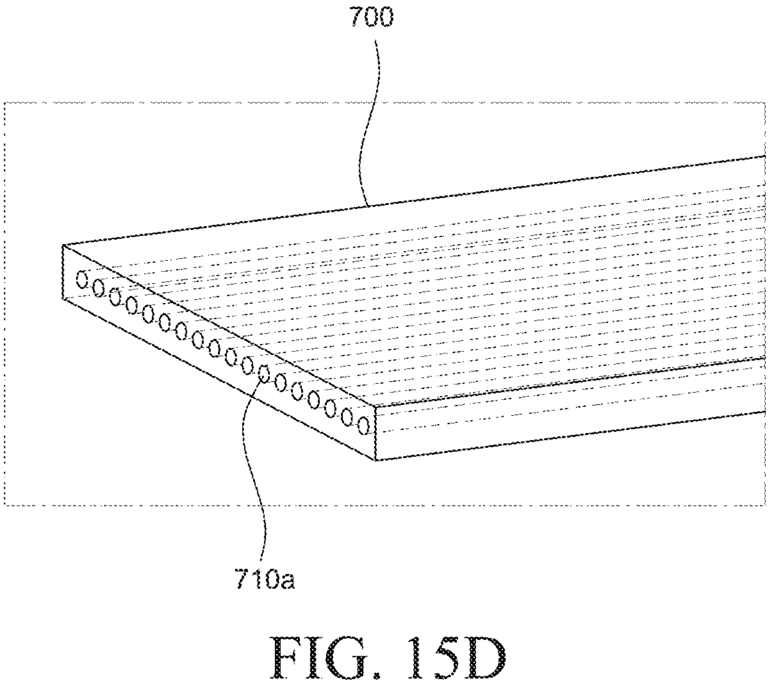

With reference to FIGS. 15C to 15D, it is possible to manufacture the reinforcement member 700 including the rigid parts 710*a* disposed between the first support layer 701 and the second support layer 702.

According to the embodiment, with reference to FIGS. 11 and 15D, the rigid part 710*a* may have a cylindrical shape elongated in the first direction 10*a* in order to reinforce the rigidity against an external force of the second direction 10*b*.

The display apparatus according to the embodiment of the present specification may be applied to a mobile device, an image telephone, a smart watch, a watch phone, a wearable apparatus, a foldable apparatus, a rollable apparatus, a bendable apparatus, a flexible apparatus, a curved apparatus, a sliding apparatus, a variable apparatus, an electronic notebook, an electronic book, a portable multimedia player (PMP), a personal digital assistant (PDA), an MP3 player, a mobile medical instrument, a desktop PC, a laptop PC, a netbook computer, a workstation, a navigation system, a navigation system for a vehicle, a display apparatus for a vehicle, a device for a vehicle, a device for a theater, a display apparatus for a theater, a television, a wallpaper device, a signage device, a gaming device, a notebook, a monitor, a camera, a camcorder, a household electrical appliance, and the like. Further, the display apparatus of the present specification may be applied to an organic light-emitting lighting device or an inorganic light-emitting lighting device.

The exemplary embodiments of the present disclosure can also be described as follows:

According to an aspect of the present disclosure, there is provided a display apparatus. The display apparatus includes a substrate comprising a display area, and a non-display area comprising a bending portion. The display apparatus further includes a support member disposed below the substrate in the display area. The display apparatus further includes a micro-coating layer disposed on the substrate in the bending portion. The display apparatus further includes a reinforcement member disposed below the substrate in the bending portion. The reinforcement member comprises a rigid part.

One surface of the reinforcement member may be attached to the substrate, and the other surface of the reinforcement member may be a non-adhesive portion.

The rigid part may be provided as a plurality of rigid parts disposed to be spaced apart from one another.

The display apparatus may further include a signal line extending from the display area to the bending portion on the substrate, and the micro-coating layer is disposed on the signal line. The signal line and the rigid part overlap each other.

The signal line and the rigid part may be disposed in different directions.

A modulus of the rigid part may be different from a modulus of the substrate.

The rigid parts may be disposed at uniform intervals.

The rigid part may include at least one of metal and plastic.

The reinforcement member may include a support layer, the support layer includes a first support layer and a second support layer, and the rigid part is disposed between the first support layer and the second support layer.

The first support layer may be a base portion, the second support layer may be disposed on the first support layer, the second support layer may be an adhesive portion, and at least one surface of the second support layer may be bonded to the substrate.

The display apparatus may include a plurality of curved portions between the first support layer and the second support layer. The rigid parts may be disposed on the plurality of curved portions.

The first support layer and the second support layer may be different in materials.

The first support layer may include polyethylene terephthalate, and the second support layer may include at least one of a pressure sensitive adhesive agent, a transparent bonding agent, or resin.

A material of the first support layer may be identical to a material of the support member.

A modulus of the rigid part and a modulus of the second support layer may be different from each other.

The display apparatus may further include a fixing member between the substrate and the support member. The fixing member may be made of the same material as the second support layer.

The display apparatus may further include a fixing member between the substrate and the support member. The fixing member may extend to the bending portion from a lower portion of the substrate.

The rigid part may have a cylindrical shape.

A thickness of the first support layer may be smaller than a thickness of the support member.

The support member may comprise: a first support member; a second support member; and a connection member, wherein in a bending state of the substrate, the connection member is disposed between the first support member and the second support member.

The substrate may comprise a front surface portion and a pad part, wherein the front surface portion comprises the display area and a part of the non-display area excluding the bending portion, wherein in the bending state of the substrate, the pad part extends from the bending portion to a rear surface of the front surface portion, wherein in the bending state of the substrate, the second support member couples to the pad part.

According to another aspect of the present disclosure, there is provided a display apparatus. The display apparatus includes a substrate comprising a display area and a bending portion. The display apparatus further includes a backplate disposed below the substrate in the display area. The display apparatus further includes a reinforcement member disposed below the substrate in the bending portion. The reinforcement member comprises at least two support layers.

The reinforcement member may include a plurality of rigid parts spaced apart from one another, and the plurality of rigid parts are disposed between the at least two support layers.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The scope of the present disclosure should be construed to include all equivalent technical concepts without limiting the scope of the claims. In other words, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:
- a substrate comprising a display area and a non-display area, the non-display area comprising a bending portion;
- a plurality of pixels disposed on a first surface of the substrate in the display area;
- a support member disposed below the substrate in the display area;
- a micro-coating layer disposed on the substrate in the bending portion; and
- a reinforcement member disposed below the substrate in the bending portion, the reinforcement member including at least two support layers stacked on each other and a plurality of curved portions between the at least two support layers,
- wherein the reinforcement member comprises at least one rod extending through the reinforcement member to increase a rigidity of the reinforcement member,
- wherein the reinforcement member is disposed on a second surface of the substrate opposite to the first surface,
- wherein the at least one rod is disposed on the plurality of curved portions.

2. The display apparatus of claim 1, wherein a first surface of the reinforcement member is attached to the substrate, and a second surface of the reinforcement member is a non-adhesive portion of the reinforcement member.

3. The display apparatus of claim 1, wherein the at least one rod includes a plurality of rods extending through the reinforcement member and spaced apart from one another.

4. The display apparatus of claim 3, wherein the plurality of rods are disposed at uniform intervals.

5. The display apparatus of claim 1, further comprising:
- a signal line extending from the display area to the bending portion on the substrate,
- wherein the micro-coating layer is disposed on the signal line, and wherein the signal line and the rigid part overlap each other.

6. The display apparatus of claim 5, wherein the signal line and the at least one rod are disposed in different directions.

7. The display apparatus of claim 1, wherein a modulus of elasticity of the at least one rod is different from a modulus of elasticity of the substrate.

8. The display apparatus of claim 1, wherein the at least one rod is metal or plastic.

9. The display apparatus of claim 1, wherein the support member comprises:

a first support member;

a second support member; and a connection member, wherein in a bent configuration of the substrate, the connection member is disposed between the first support member and the second support member.

10. The display apparatus of claim 9, wherein the substrate comprises a front surface portion and a pad part, wherein the front surface portion comprises the display area and a part of the non-display area excluding the bending portion, wherein in the bent configuration of the substrate, the pad part extends from the bending portion to a rear surface of the front surface portion, wherein in the bending state of the substrate, the second support member couples to the pad part.

11. A display apparatus, comprising:

a substrate having a display area, a non-display area, and a bending portion;

a plurality of pixels disposed on a first surface of the substrate in the display area;

a support member disposed below the substrate in the display area; and a reinforcement member disposed below the substrate in the bending portion, wherein the reinforcement member is disposed on a second surface of the substrate opposite to the first surface, wherein the reinforcement member includes at least two support layers stacked on each other in a sequential layer stack, at least one reinforcing member being a rod disposed between the at least two support layers such that the reinforcing member is internal to the sequential layer stack, and a plurality of curved portions between the at least two support layers, wherein the at least one reinforcing member is disposed on the plurality of curved portions.

12. The display apparatus of claim 11, wherein the at least two support layers includes a first support layer being a base layer and a second support layer being an adhesive layer coupled to the substrate.

13. The display apparatus of claim 11, wherein the at least two support layers include at least two layers having a different material composition from each other.

14. The display apparatus of claim 11, wherein the at least two support layers includes a polyethylene terephthalate layer, and a further layer including at least one of a pressure sensitive adhesive agent, a transparent bonding agent, and a resin.

15. The display apparatus of claim 11, wherein a material of one of the at least two support layers is identical to a material of the support member.

16. The display apparatus of claim 11, wherein a modulus of elasticity of the reinforcing member and a modulus of elasticity of one of the at least two support layers are different from each other.

17. The display apparatus of claim 11, further comprising:

an adhesive layer between the substrate and the support member, wherein the adhesive layer is made of a same material as the second support layer.

18. The display apparatus of claim 11, further comprising:

an adhesive layer between the substrate and the support member, wherein the adhesive layer extends from a lower portion of the substrate to the bending portion.

19. The display apparatus of claim 11, wherein the rod extends internally through the sequential layer stack.

20. The display apparatus of claim 11, wherein a thickness of one of the at least two support layers is less than a thickness of the support member.

21. The display apparatus of claim 9, further comprising:

a backplate disposed below the substrate in the display area;

a plurality of support members in a multi-layer stack, wherein a portion of the substrate is bent at the bending portion and disposed under the display area, wherein the multi-layer stack is coupled to the portion of the substrate bent under the display area and to a further portion of the substrate corresponding to the display area, wherein the reinforcement member extends from a side surface of an upper one of the plurality of support members, through the bending portion, and to a side surface of a lower one of the plurality of support members.

22. The display apparatus of claim 21, wherein the reinforcement member comprises a plurality of rigid parts spaced apart from one another.

* * * * *